(12) United States Patent
Chung et al.

(10) Patent No.: US 8,867,430 B2
(45) Date of Patent: Oct. 21, 2014

(54) METHOD AND APPARATUS FOR PERFORMING HARQ PROCESS IN WIRELESS COMMUNICATION SYSTEM

(75) Inventors: Jae Hoon Chung, Gyeongki-do (KR); So Yeon Kim, Gyeongki-do (KR); Kyu Jin Park, Gyeongki-do (KR); Seung Hee Han, Gyeongki-do (KR); Yeong Hyeon Kwon, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 13/126,918

(22) PCT Filed: Oct. 30, 2009

(86) PCT No.: PCT/KR2009/006319
§ 371 (c)(1),
(2), (4) Date: Apr. 29, 2011

(87) PCT Pub. No.: WO2010/050766
PCT Pub. Date: May 6, 2010

(65) Prior Publication Data
US 2011/0211522 A1 Sep. 1, 2011

Related U.S. Application Data

(60) Provisional application No. 61/110,546, filed on Oct. 31, 2008, provisional application No. 61/156,886, filed on Mar. 3, 2009.

(51) Int. Cl.
*H04W 88/04* (2009.01)
*H04L 5/00* (2006.01)
(Continued)

(52) U.S. Cl.
CPC ............ *H04L 1/1887* (2013.01); *H04L 5/0055* (2013.01); *H04L 1/1861* (2013.01);
(Continued)

(58) Field of Classification Search
CPC ... H04L 1/1822; H04L 1/1861; H04L 1/1887; H04L 1/1812; H04L 1/1671; H04L 1/0026; H04L 5/001; H04L 5/0055; H04L 5/0057

USPC .......................................................... 370/315
See application file for complete search history.

(56) References Cited

U.S. PATENT DOCUMENTS

2005/0003768 A1  1/2005  Laroia et al.
(Continued)

FOREIGN PATENT DOCUMENTS

| CN | 101222272 A | 7/2008 |
| CN | 101299634 A | 11/2008 |

(Continued)

OTHER PUBLICATIONS

3GPP TSG-RAN WG1 #56, R1-090753, "Control Channel and Data Channel Design for Relay Link in LTE-Advanced", Nortel, Feb. 9-13, 2009, pp. 1-9.
(Continued)

*Primary Examiner* — Jeffrey M Rutkowski
*Assistant Examiner* — Rasha Fayed
(74) *Attorney, Agent, or Firm* — Morgan, Lewis & Bockius LLP

(57) ABSTRACT

A method of performing hybrid automatic repeat request (HARQ) by a source station in a wireless communication system is provided. The method includes: transmitting data to a destination station at a transmission start time; receiving an acknowledgment (ACK) or negative-acknowledgement (NACK) signal for the data from the destination station after a first transmission time interval elapses from the transmission start time; and upon receiving the NACK signal, retransmitting the data after a second transmission time interval elapses from the transmission start time, wherein the second transmission time interval is one transmission time interval selected from a plurality of predetermined transmission time intervals. Accordingly, the wireless communication system can perform a heterogeneous HARQ process in which an HARQ period, an ACK/NACK transmission start time, and the like are different.

8 Claims, 24 Drawing Sheets

(51) Int. Cl.
*H04L 1/18* (2006.01)
*H04L 1/00* (2006.01)
*H04L 1/16* (2006.01)

(52) U.S. Cl.
CPC ............ *H04L 1/1812* (2013.01); *H04L 1/0026* (2013.01); *H04L 1/1822* (2013.01); *H04L 5/001* (2013.01); *H04L 1/1671* (2013.01); *H04L 5/0057* (2013.01)
USPC ........... 370/315; 370/216; 370/279; 370/329; 370/341

(56) References Cited

U.S. PATENT DOCUMENTS

| | | | |
|---|---|---|---|
| 2005/0122898 A1 | 6/2005 | Jang et al. | |
| 2005/0227628 A1 | 10/2005 | Inanoglu | |
| 2008/0070582 A1* | 3/2008 | Cai | 455/450 |
| 2008/0095038 A1* | 4/2008 | Chang et al. | 370/208 |
| 2008/0095106 A1* | 4/2008 | Malladi et al. | 370/329 |
| 2008/0144552 A1* | 6/2008 | Johansson et al. | 370/310 |
| 2008/0181167 A1 | 7/2008 | Sydir et al. | |
| 2008/0192674 A1* | 8/2008 | Wang et al. | 370/315 |
| 2008/0198941 A1* | 8/2008 | Song et al. | 375/260 |
| 2008/0240014 A1* | 10/2008 | Chang et al. | 370/315 |
| 2008/0282126 A1* | 11/2008 | Chindapol et al. | 714/748 |
| 2008/0310540 A1* | 12/2008 | Tiirola et al. | 375/267 |
| 2009/0046637 A1 | 2/2009 | Kim et al. | |
| 2009/0109892 A1* | 4/2009 | Oyman et al. | 370/315 |
| 2009/0257403 A1 | 10/2009 | Jeon et al. | |
| 2009/0262678 A1* | 10/2009 | Oyman et al. | 370/315 |
| 2010/0002647 A1 | 1/2010 | Ahn et al. | |
| 2010/0005351 A1 | 1/2010 | Ahn et al. | |
| 2010/0098012 A1* | 4/2010 | Bala et al. | 370/329 |
| 2010/0144282 A1 | 6/2010 | Laroia et al. | |
| 2010/0290376 A1 | 11/2010 | Dai et al. | |
| 2011/0051657 A1* | 3/2011 | Li et al. | 370/328 |
| 2011/0194500 A1* | 8/2011 | Kim et al. | 370/328 |

FOREIGN PATENT DOCUMENTS

| | | |
|---|---|---|
| KR | 2005-0043302 | 5/2005 |
| KR | 2008-0002292 | 1/2008 |
| KR | 2008-0020425 | 3/2008 |

OTHER PUBLICATIONS

3GPP TSG-RAN WG1 #55bis, R1-090153, "Control Channel and Data Channel Design for Relay Link in LTE-Advanced", Notrel Networks, Jan. 12-16, 2009, pp. 1-18.

International Search Report from PCT/KR2010/001144 (PCT of related technology application).

International Search Report from PCT/KR2009/006319 (PCT corresponding to present application).

Nortel, "Control Channel and Data Channel Design for Relay Link in LTE-Advanced," 3GPP TSG-RAN Working Group 1 Meeting #56, R1-090753, Athens, Greece, Feb. 9-13, 2009.

Office Action issued in CN Patent Application No. 201080010321.X dated Nov. 5, 2013.

Office Action issued in technologically related U.S. Appl. No. 12/922,595 dated Dec. 21, 2012.

* cited by examiner

METHOD AND APPARATUS FOR PERFORMING HARQ PROCESS IN WIRELESS COMMUNICATION SYSTEM

The present application is a national stage of PCT International Application No. PCT/KR2009/006319, filed Oct. 30, 2009, and claims the benefit of U.S. Provisional Application Nos. 61/110,546, filed Oct. 31, 2008, and 61/156,886, filed Mar. 3, 2009.

TECHNICAL FIELD

The present invention relates to wireless communications, and more particularly, to a method and apparatus for performing a hybrid automatic repeat request (HARQ) process in a wireless communication system.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

Long term evolution-advanced (LTE-A) of $3^{rd}$ generation partnership project (3GPP) is one of promising candidates of a system standard satisfying requirements of the IMT-advanced. The LTE-A is an improved version of 3GPP LTE (hereinafter LTE). The LTE is a part of evolved-UMTS (E-UMTS) using evolved-universal terrestrial radio access network (E-UTRAN). The LTE employs orthogonal frequency division multiple access (OFDMA) in a downlink and employs single carrier-frequency division multiple access (SC-FDMA) in an uplink.

A 3GPP LTE system uses hybrid automatic repeat request (HARQ) to increase transmission efficiency. The HARQ can be classified into downlink HARQ and uplink HARQ. In the downlink HARQ, when a base station (BS) transmits downlink data, a user equipment (UE) transmits an acknowledgement (ACK)/not-acknowledgement (NACK) signal for the downlink data. In the uplink HARQ, when the UE transmits uplink data, the BS transmits an ACK/NACK signal for the uplink data.

In a case where HARQ is applied in general to the LTE or other wireless communication systems, an HARQ timing relationship is defined with a channel of 8 transmission time intervals (TTIs), that is, an HARQ period corresponding to an interval of 8 subframes. The HARQ timing relationship shows a time-domain relation for a transmission start time of an ACK/NACK signal for reception data and a retransmission start time of data in case of receiving the NACK signal. The HARQ timing relationship is determined by considering a decoding time of shared channel data and the ACK/NACK signal on the uplink or the downlink.

However, a future wireless communication system such as LTE-A may require to change the conventional HARQ timing relationship. For example, a required HARQ period may be decreased due to diversification of UE capability and due to decrease in a decoding processing time of the BS and the UE. Alternatively, the required HARQ period may be increased since a relay station and a new technique such as multiple input multiple output (MIMO) using a greater number of antennas are applied to the future wireless communication system. Therefore, there may be a case where a heterogeneous HARQ timing relationship has to be applied in the wireless communication system.

Accordingly, there is a need to consider how to perform an HARQ process having a heterogeneous HARQ timing relationships and how to perform signaling and radio resource allocation when performing the HARQ process in the wireless communication system.

SUMMARY OF INVENTION

Technical Problem

The present invention provides a method and apparatus for performing a hybrid automatic repeat request (HARQ) process in a wireless communication system.

Technical Solution

According to an aspect of the present invention, a method of performing a HARQ process by a source station in a wireless communication system is provided. The method includes: transmitting data to a destination station at a transmission start time; receiving an acknowledgment (ACK) or negative-acknowledgement (NACK) signal for the data from the destination station after a first transmission time interval elapses from the transmission start time; and upon receiving the NACK signal, retransmitting the data after a second transmission time interval elapses from the transmission start time, wherein the second transmission time interval is one transmission time interval selected from a plurality of predetermined transmission time intervals.

According to another aspect of the present invention, there is provided a mobile station including: a radio frequency (RF) unit transmitting and receiving a radio signal; and a processor coupled to the RF unit, wherein the processor transmits data to a source station at a transmission start time, receives an ACK or NACK signal for the data from the source station after a first transmission time interval elapses from the transmission start time, and upon receiving the NACK signal, retransmits the data after a second transmission time interval elapses from the transmission start time, wherein the second transmission time interval is one transmission time interval selected from a plurality of predetermined transmission time intervals.

Advantageous Effects

According to the present invention, a wireless communication system can perform a heterogeneous hybrid automatic repeat request (HARQ) process in which an HARQ period, an acknowledgement (ACK)/not-acknowledgement (NACK) transmission start time, and the like are different. Therefore, a change in a communication environment can be flexibly dealt with. The present invention can be applied to a new wireless communication system while maintaining an operation of the conventional $3^{rd}$ generation partnership project (3GPP) long term evolution (LTE) system.

MODE FOR INVENTION

Long term evolution (LTE) of the 3$^{rd}$ generation partnership project (3GPP) is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiplex access (SC-FDMA) in an uplink. LTE-advance (LTE-A) is an evolution of the 3GPP LTE.

For clarity, the following description will focus on the 3GPP LTE/LTE-A. However, technical features of the present invention are not limited thereto. For example, the present invention is also applicable to ultra mobile broadband (UMB) enhancement or institute of electrical and electronics engineers (IEEE) 802.16m that is a system standard candidate of IMT-Advanced.

Figure 1:
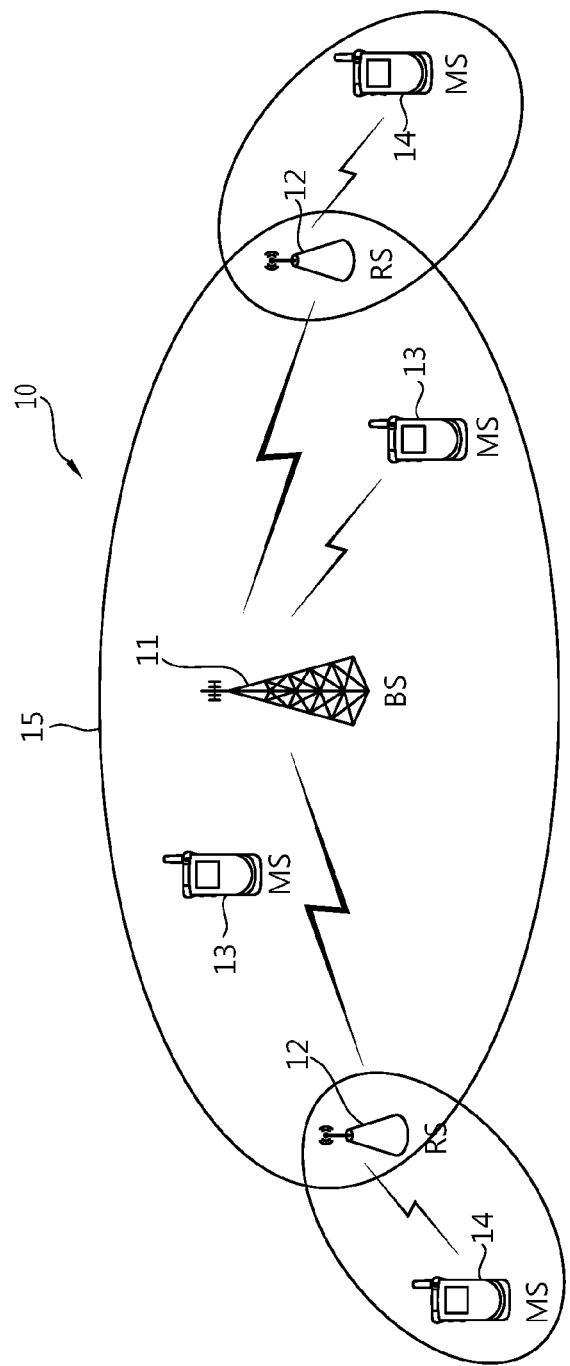
FIG. 1 shows a wireless communication system.

FIG. 1 shows a wireless communication system employing a relay station (RS).

Referring to FIG. 1, a wireless communication system 10 employing an RS includes at least one base station (BS) 11.

Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), etc. The BS 11 can perform functions such as connectivity between an RS 12 and a UE 14, management, control, resource allocation, etc.

The RS 12 is a device for relaying a signal between the BS 11 and the UE 14, and is also referred to as another terminology such as a relay node (RN), a repeater, a relay, etc. A relay scheme used in the RS may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, the macro UE (or Ma UE) 13 denotes a UE that directly communicates with the BS 11, and the relay UE (or Re UE) 14 denotes a UE that communicates with the RS. Unless otherwise specified, the UE is the Ma UE. Even if the Ma UE 13 exists in a cell of the BS 11, the Ma UE 13 can communicate with the BS 11 via the RS 12 to improve a data transfer rate depending on a diversity effect.

Hereinafter, a downlink (DL) denotes communication from the BS 11 to the Ma UE 13, and an uplink (UL) denotes communication from the Ma UE 13 to the BS 11. A backhaul link denotes a link between the BS 11 and the RS 12. A backhaul DL denotes communication from the BS 11 to the RS 12. A backhaul UL denotes communication from the RS 12 to the BS 11. An access link denotes a link between the RS 12 and the Re UE 14. An access DL denotes communication from the RS 12 to the Re UE 14. An access UL denotes communication from the Re UE 14 to the RS 12.

The wireless communication system 10 employing the RS is a system supporting bidirectional communication. The bidirectional communication may be performed by using a time division duplex (TDD) mode, a frequency division duplex (FDD) mode, etc. When in the TDD mode, UL transmission and DL transmission use different time resources, and backhaul UL transmission and backhaul DL transmission use different time resources, and access UL transmission and access DL transmission use different time resources. When in the FDD mode, different frequency resources are used in the aforementioned link transmissions.

The wireless communication system employing the RS may be a multiple carrier system. The conventional 3GPP LTE system supports case where a DL bandwidth is set differently from a UL bandwidth under the assumption that one carrier is used. This implies that the 3GPP LTE is supported only when the DL bandwidth is equal to or different from the UL bandwidth in a condition where one carrier is defined for each of the DL and the UL. For example, the 3GPP LTE system can support up to 20 MHz, and the UL bandwidth and the DL bandwidth may be different from each other. In this case, however, only one carrier is supported for the UL and the DL.

Meanwhile, the multiple carrier system supports spectrum aggregation (also referred to as bandwidth aggregation or carrier aggregation). The spectrum aggregation is for supporting a plurality of carriers. The spectrum aggregation is introduced to support an increasing throughput, to prevent cost rising caused by introduction of a broadband radio frequency (RF) device, and to ensure compatibility with a legacy system. For example, when 5 carriers are assigned with a granularity of a carrier unit having a bandwidth of 20 MHz, up to 100 MHz can be supported.

The spectrum aggregation can be classified into contiguous spectrum aggregation achieved between consecutive carriers in a frequency domain and non-contiguous spectrum aggregation achieved between discontinuous carriers. The number of aggregated carriers may be set differently between the DL and the UL (the same is also true in the UL/DL of the backhaul link and the access link). Symmetric aggregation is achieved when the number of DL carriers is equal to the number of UL carriers. Asymmetric aggregation is achieved when the number of DL carriers is different from the number of UL carriers.

Figure 2:
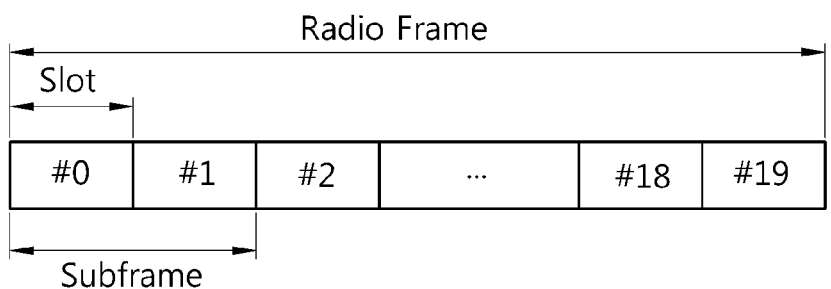
FIG. 2 shows a radio frame structure in $3^{rd}$ generation partnership project (3GPP) long term evolution (LTE).

FIG. 2 shows a radio frame structure in 3GPP LTE.

Referring to FIG. 2, a radio frame consists of 10 subframes, and one subframe consists of two slots. A transmission time interval (TTI) is defined as a time for transmitting one subframe. For example, one subframe may have a length of 1 millisecond (ms), and one slot may have a length of 0.5 ms.

One slot includes a plurality of orthogonal frequency division multiplexing (OFDM) symbols in a time domain and a plurality of resource blocks (RBs) in a frequency domain. The OFDM symbol is for expressing one symbol period since the 3GPP LTE uses OFDMA in the DL. According to a multiple access scheme, the OFDM symbol may be referred to as an SC-FDMA symbol or a symbol period. An RB is a resource allocation unit, and includes a plurality of consecutive subcarriers in one slot. The structure of the radio frame is for exemplary purpose only, and the number of subframes included in the radio frame or the number of slots included in the subframe and the number of OFDM symbols included in the slot can change variously.

Figure 3:
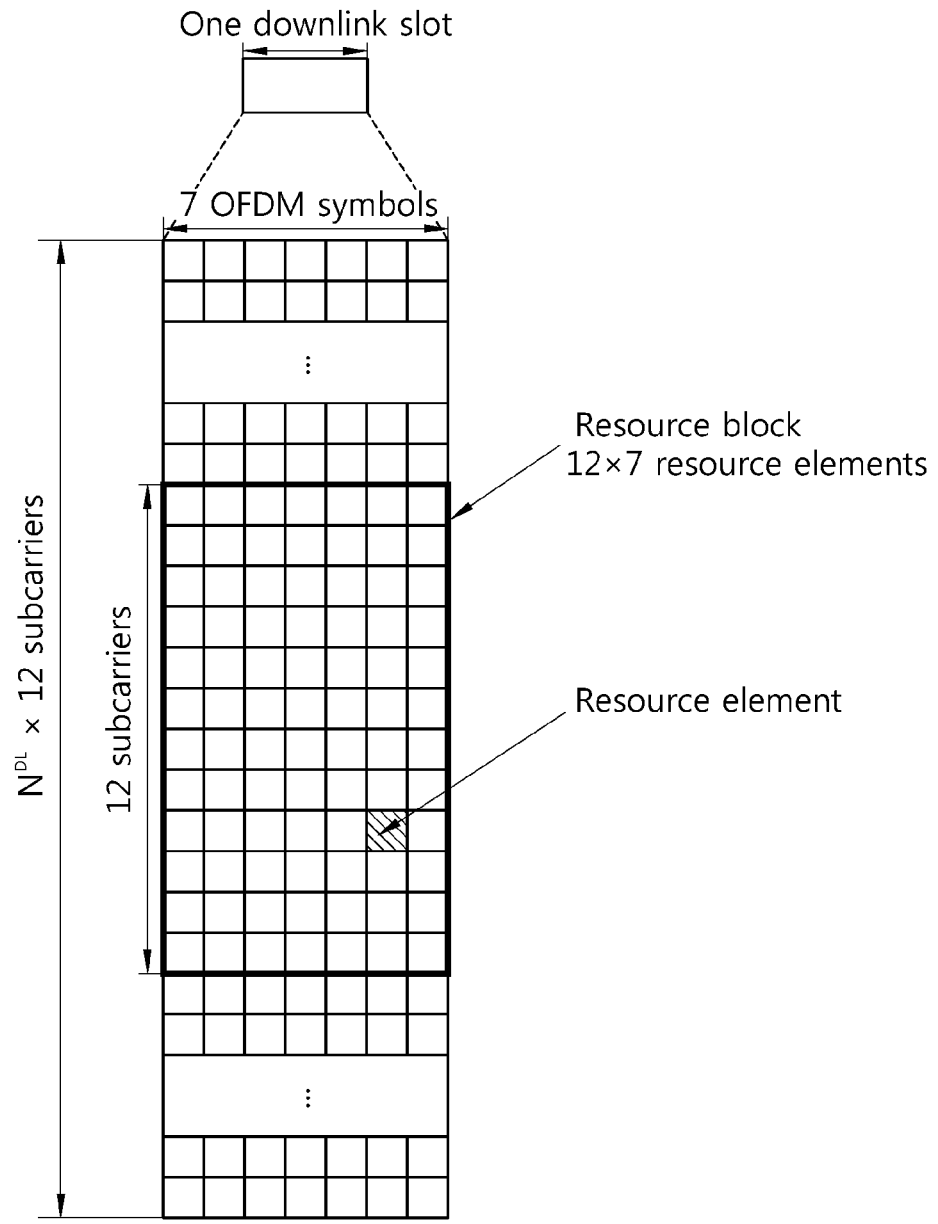
FIG. 3 is a diagram showing an example of a resource grid for one downlink slot.

FIG. 3 is a diagram showing an example of a resource grid for one DL slot.

Referring to FIG. 3, the DL slot includes a plurality of OFDM symbols in a time domain. Although it is described herein that one DL slot includes 7 OFDM symbols, and one RB includes 12 subcarriers in a frequency domain, the present invention is not limited thereto.

Each element on the resource grid is referred to as a resource element (RE). One RB includes 12×7 REs. An RB group is an aggregation of four RBs. The number $N^{DL}$ of RBs included in the DL slot depends on a DL transmission bandwidth defined in a cell.

Figure 4:
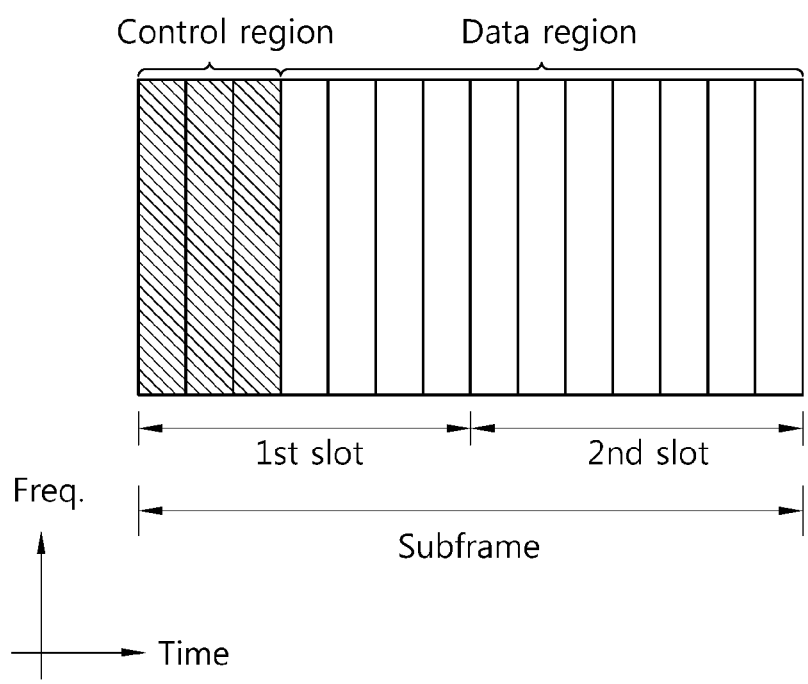
FIG. 4 shows an example of a downlink subframe structure.

FIG. 4 shows an example of a DL subframe structure.

Referring to FIG. 4, a subframe includes two slots. Up to three preceding OFDM symbols of a $1^{st}$ slot in the subframe correspond to a control region to which control channels are assigned. The remaining OFDM symbols correspond to a data region to which a physical downlink shared channel (PDSCH) is assigned.

Examples of DL control channels used in 3GPP LTE include a physical control format indicator channel (PCFICH), a physical downlink control channel (PDCCH), a physical hybrid-ARQ indicator channel (PHICH), etc. The PCFICH transmitted in a $1^{st}$ OFDM symbol of the subframe carries information regarding the number of OFDM symbols (i.e., a size of the control region) used for transmission of the control channels in the subframe.

Control information transmitted on the PDCCH is referred to as downlink control information (DCI). The DCI indicates UL resource allocation information, DL resource allocation information, and UL transmit power control commands for any UE group, etc.

The PDCCH can carry a downlink shared channel (DL-SCH)'s resource allocation and transmission format, an uplink shared channel (UL-SCH)'s resource allocation information, paging information regarding a paging channel (PCH), system information regarding the DL-SCH, a resource allocation of a higher-layer control message such as a random access response transmitted on the PDSCH, an aggregation of transmit power control commands for individual UEs in any UE group, activation of a voice over Internet (VoIP), etc. A plurality of PDCCHs can be transmitted in the control region, and a UE can monitor the plurality of PDCCHs. The PDCCH is transmitted on an aggregation of one or several consecutive control channel elements (CCEs). The CCE is a logical allocation unit used to provide the PDCCH with a coding rate depending on a state of a radio channel. The CCE corresponds to a plurality of resource element groups. According to an association relation between the number of CCEs and a coding rate provided by the CCEs, a format of the PDCCH and the number of bits of an available PDCCH are determined.

The PHICH carries an acknowledgement (ACK)/not-acknowledgement (NACK) signal for UL hybrid automatic repeat request (HARQ). That is, an ACK/NACK signal for UL data transmitted by the UE is transmitted on the PHICH.

Figure 5:
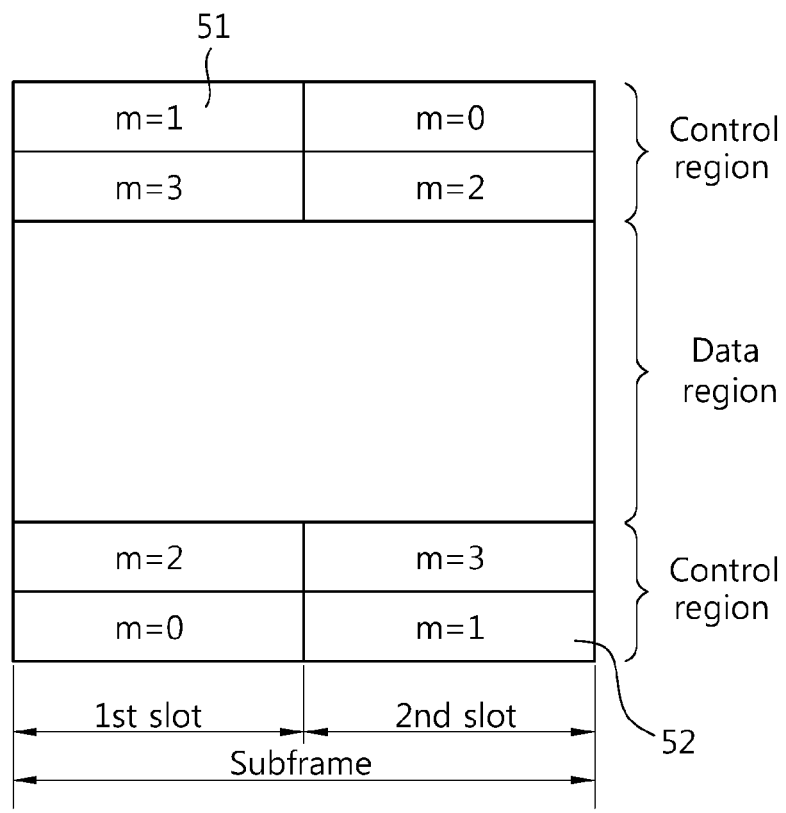
FIG. 5 shows an uplink subframe structure.

FIG. 5 shows a UL subframe structure.

Referring to FIG. 5, a UL subframe may be divided into a control region to which a physical uplink control channel (PUCCH) carrying UL control information is assigned and a data region to which a physical uplink shared channel (PUSCH) carrying user data is assigned.

The PUCCH for one UE is assigned to a resource block (RB) pair of RBs 51 and 52 in a subframe. The RBs 51 and 52 belonging to the RB pair occupy different subcarriers in each of the two slots. In this case, it is said that the RB pair assigned to the PUCCH is frequency hopped in a slot boundary.

The PUCCH can support multiple formats. That is, UL control information having a different number of bits per subframe can be transmitted according to a modulation scheme. For example, when using binary phase shift keying (BPSK) (PUCCH format 1a), 1-bit UL control information can be transmitted through the PUCCH, and when using quadrature phase shift keying (QPSK) (PUCCH format 1b), 2-bit UL control information can be transmitted through the PUCCH. In addition thereto, examples of the PUCCH format include a format 1, a format 2, a format 2a, a format 2b, etc. (The section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.)

The UL control information can be transmitted using a cyclically shifted sequence. The cyclically shifted sequence can be generated by cyclically shifting a base sequence by a specific cyclic shift (CS) amount. Various types of sequences can be used as the base sequence. For example, a well-known sequence such as a pseudo noise (PN) sequence and a Zadoff-Chu (ZC) sequence can be used as the base sequence. Alternatively, when one RB includes 12 subcarriers, the following sequence having a length of 12 can be used as the base sequence.

$$r_i(n) = e^{jb(n)\pi/4} \quad \text{[Equation 1]}$$

Herein, $i \in \{0, 1, \ldots, 29\}$ denotes a root index, and n denotes a component index in the range of $0 \leq n \leq N-1$, where N is a sequence length. A different base sequence is defined according to a different root index. When N=12, b(n) can be defined by the following table.

TABLE 1

| i | b(0), . . . , b(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

A base sequence r(n) can be cyclically shifted according to Equation 2 below.

$$r(n,a)=r((n+a) \bmod N), \text{ for } n=0, \ldots, N-1 \quad \text{[Equation 2]}$$

Herein, 'a' denotes a CS amount, and 'mod' denotes a modular operation. The number of available CSs varies depending on a CS unit. If the CS is possible in a unit of one subcarrier, 'a' can be any value in the range of 0 to N−1, and the number of available CSs is N. Alternatively, if the CS is possible in a unit of 2 subcarriers, 'a' can be any value of {0, 2, 4, . . . , N−1}, and the number of available CSs is N/2.

Hereinafter, the available CS of the base sequence denotes a CS that can be derived from the base sequence according to the CS unit. For example, if the base sequence has a length of 12 and the CS unit is 1, the total number of available CSs of the base sequence is 12. Alternatively, if the base sequence has a length of 12 and the CS unit is 6, the total number of available CSs of the base sequence is 6.

Figure 6:
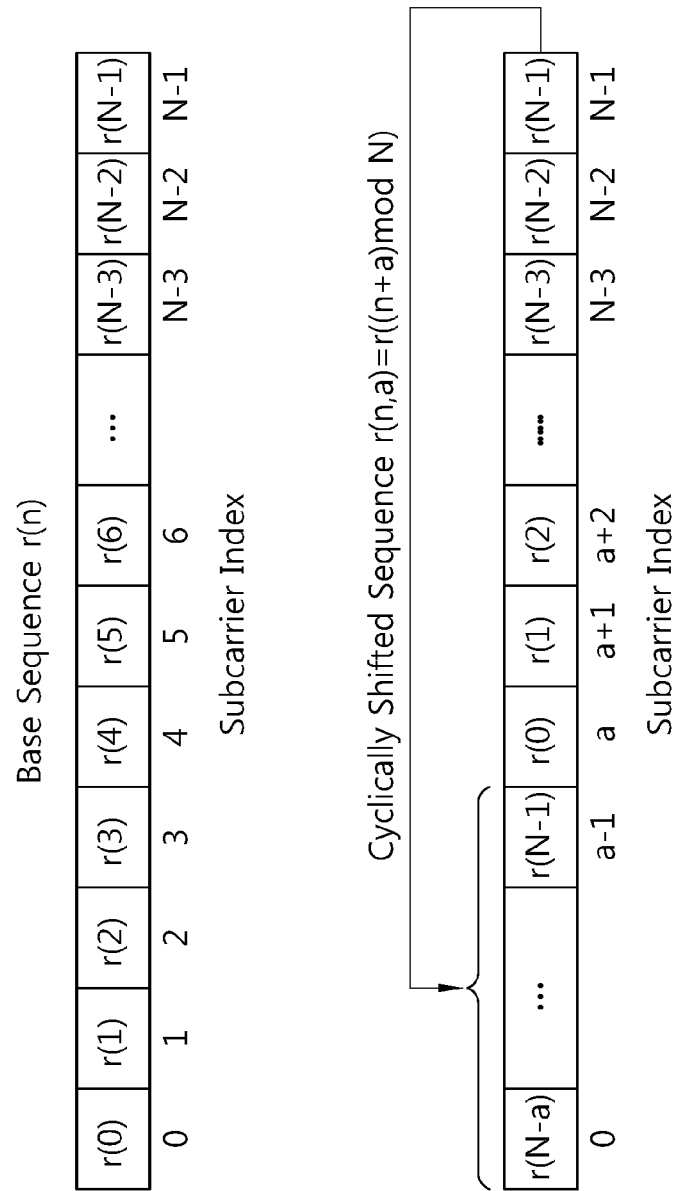
FIG. 6 shows a base sequence r(n) and a cyclically shifted sequence r(n, a).

FIG. 6 shows a base sequence r(n) and a cyclically shifted sequence r(n, a). A base sequence having a length of N consists of N components r(0) to r(N−1). The cyclically shifted sequence r(n, a) is generated by cyclically shifting the N components r(0) to r(N−1) by a CS amount 'a'. That is, r(0) to r(N−a−1) are mapped from a subcarrier index 'a', and r(N−a) to r(N−1) are shifted to a first part of the cyclically shifted sequence r(n, a).

Figure 7:
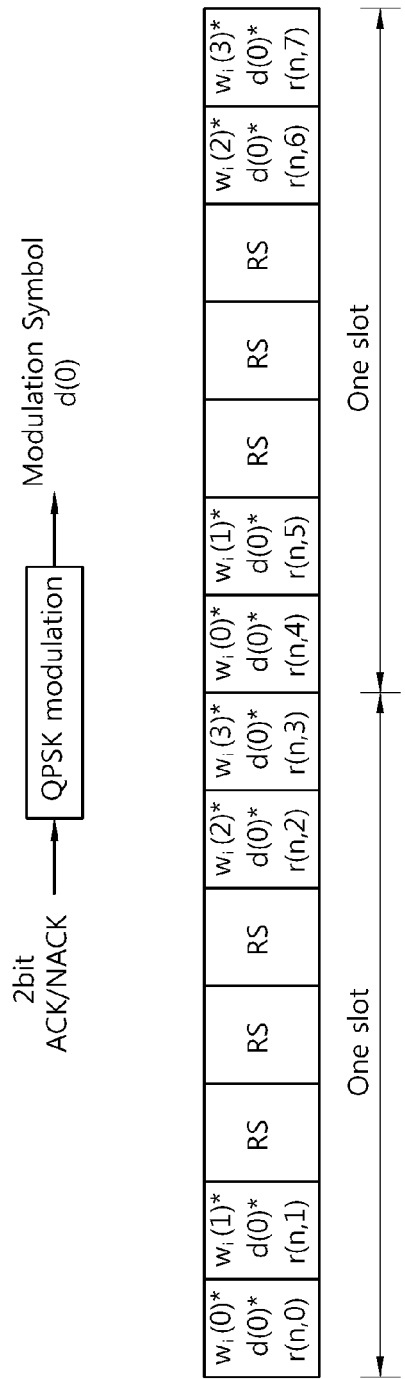
FIG. 7 shows transmission of an acknowledgement (ACK)/not-acknowledgement (NACK) signal.

FIG. 7 shows transmission of an ACK/NACK signal.

Referring to FIG. 7, among 7 SC-FDMA symbols included in one slot, a reference signal (RS) is carried on 3 SC-FDMA symbols, and the ACK/NACK signal is carried on the remaining 4 SC-FDMA symbols. The RS is carried on 3 contiguous SC-FDMA symbols in the middle of the slot. In this case, the location and the number of symbols used in the RS may vary, and accordingly, the location and the number of symbols used in the ACK/NACK signal may also vary.

To transmit the ACK/NACK signal, a 2-bit ACK/NACK signal is QPSK-modulated to generate one modulation symbol d(0). A modulated sequence m(n) is generated based on the modulation symbol d(0) and the cyclically shifted sequence r(n, a). The cyclically shifted sequence r(n, a) is multiplied by the modulation symbol to generate the following modulated sequence m(n).

$$m(n)=d(0)r(n,a) \quad \text{[Equation 3]}$$

A CS amount of the cyclically shifted sequence r(n, a) may vary for each SC-FDMA symbol or may be identical in each SC-FDMA symbol. Although it is described herein that a CS amount 'a' is set to 0, 1, 2, and 3 sequentially for 4 SC-FDMA symbols in one slot, this is for exemplary purposes only.

In addition, to increase UE capacity, the modulated sequence can be spread by using an orthogonal sequence for each slot. The following sequence can be used based on the orthogonal sequence $w_i(k)$ having the spread factor K=4 (where i is a sequence index and $0 \le k \le K-1$).

TABLE 2

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Alternatively, the following sequence can be used based on the orthogonal sequence $w_i(k)$ having the spread factor K=3 (where i is a sequence index and $0 \le k \le K-1$).

TABLE 3

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Herein, it is shown that a modulated sequence is spread by using the orthogonal sequence $w_i(k)$ having the spreading factor K=4 with respect to 4 SC-FDMA symbols in one slot for the ACK/NACK signal.

The ACK/NACK signal is not limited to 2 bits, and thus can be configured with 1 bit or more bits. A modulation scheme is not limited to QPSK, and thus BPSK or a higher-order modulation scheme can also be used. For example, one modulation symbol is generated using BPSK modulation for a 1-bit ACK/NACK signal, and a modulated sequence can be generated based on the modulation symbol and a cyclically shifted sequence.

Figure 8:
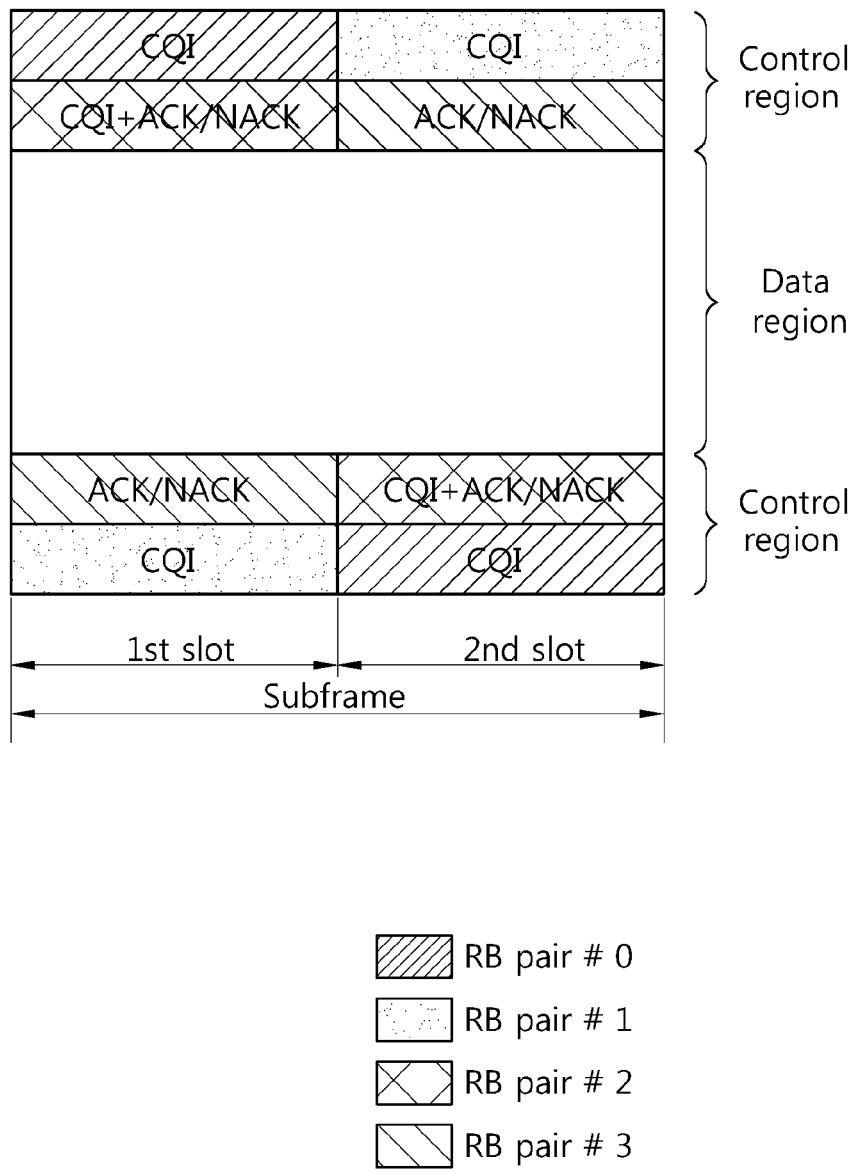
FIG. 8 shows an example of resource allocation for transmission of uplink control information.

FIG. 8 shows an example of resource allocation for transmission of UL control information.

Referring to FIG. 8, resources for transmission of channel quality information (CQI) are allocated to RB pairs #0 and #1. A resource for transmission of CQI and ACK/NACK is allocated to an RB pair #2. A resource for transmission of ACK/NACK is allocated to an RB pair #3. Since a resource for a plurality of pieces of control information is allocated to the RB pair #2, it is called a mixed RB to distinguish it from an RB for transmission of one piece of control information. In each slot, an RB used in PUCCH transmission can be determined based on a base sequence and a cyclic shift (CS) amount.

Now, a method of performing an HARQ process of a wireless communication system will be described. The wireless communication system can support UL and/or DL HARQ.

Figure 9:
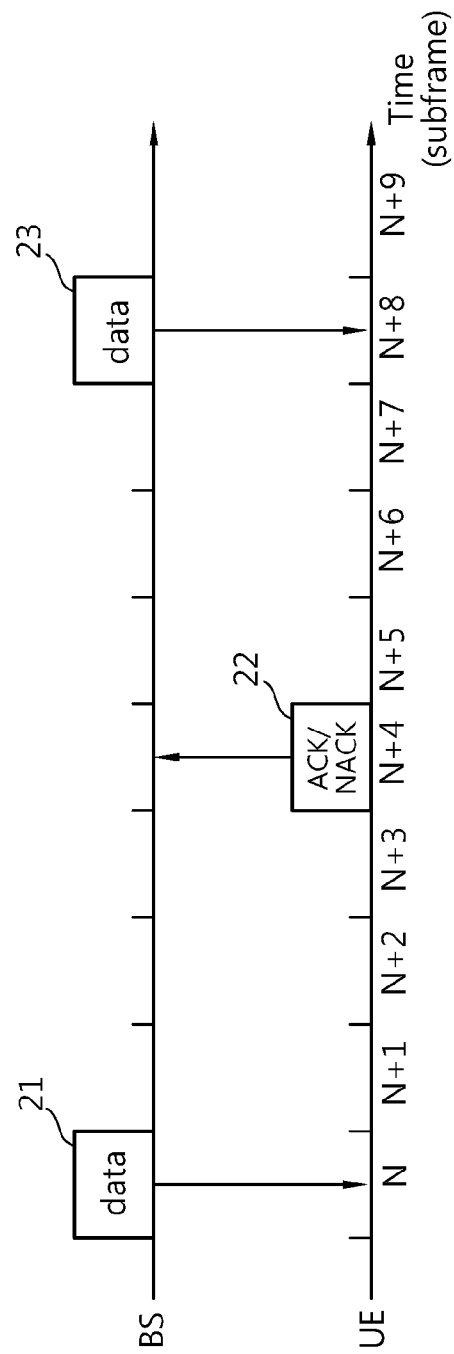
FIG. 9 shows downlink hybrid automatic repeat request (HARQ).

FIG. 9 shows DL HARQ.

Referring to FIG. 9, upon receiving DL data 21 from a BS in a subframe N, a UE transmits an ACK/NACK signal 22 in a subframe N+4. The ACK/NACK signal 22 is an ACK signal when the DL data 21 is successfully decoded, and is an NACK signal when the DL data 21 is unsuccessfully decoded. Upon receiving the NACK signal, the BS may transmit retransmission data 23 until the ACK signal is received or until the number of retransmissions reaches the maximum number of retransmissions.

In this case, the ACK/NACK signal 22 transmitted by the UE is transmitted through a PUCCH of the subframe N+4. A radio resource region to which the PUCCH is allocated in the subframe N+4 can be determined based on a lowest CCE index of a PDCCH of the subframe N.

In addition, the UE may measure a DL channel state to report CQI to the BS periodically and/or non-periodically. The BS can use the CQI in DL scheduling. The BS can report a CQI transmission start time or information on resource allocation to the UE.

Figure 10:
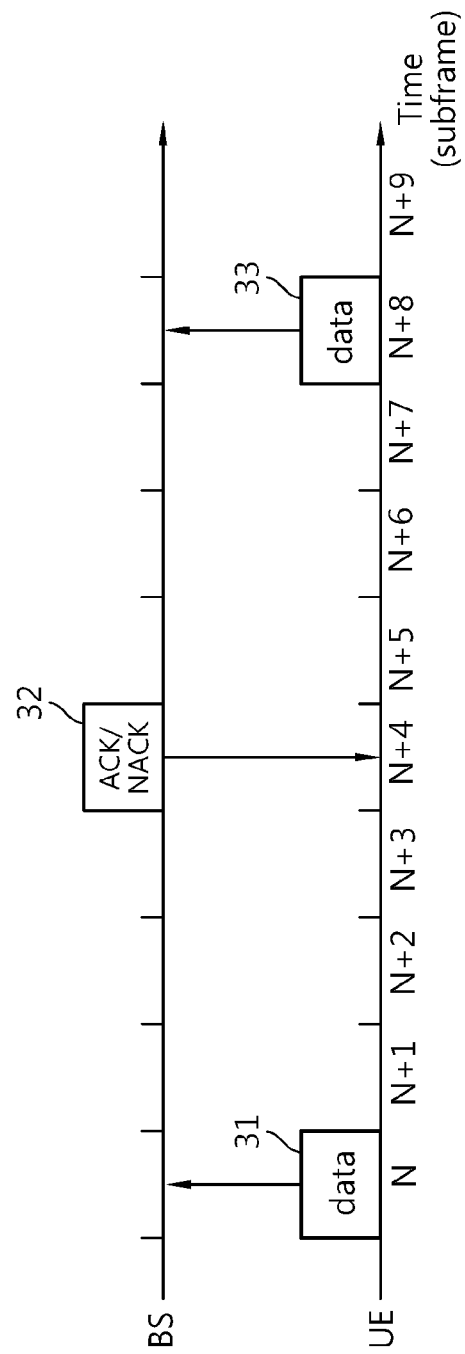
FIG. 10 shows uplink HARQ.

FIG. 10 shows UL HARQ.

Upon receiving UL data 31 through a physical uplink shared channel (PUSCH) of a subframe N from a UE, a BS transmits an ACK/NACK signal 32 through a PHICH of a subframe N+4. The ACK/NACK signal 32 is an ACK signal when the UL data 31 is successfully decoded, and is an NACK signal when the UL data 31 is unsuccessfully decoded. Upon receiving the NACK signal, the UE can transmit retransmission data 33 for the UL data 31 until the ACK signal is received or until the number of retransmissions reaches the maximum number of retransmissions. The BS can transmit an ACK/NACK signal for the retransmission data 33 through the PHICH.

Figure 11:
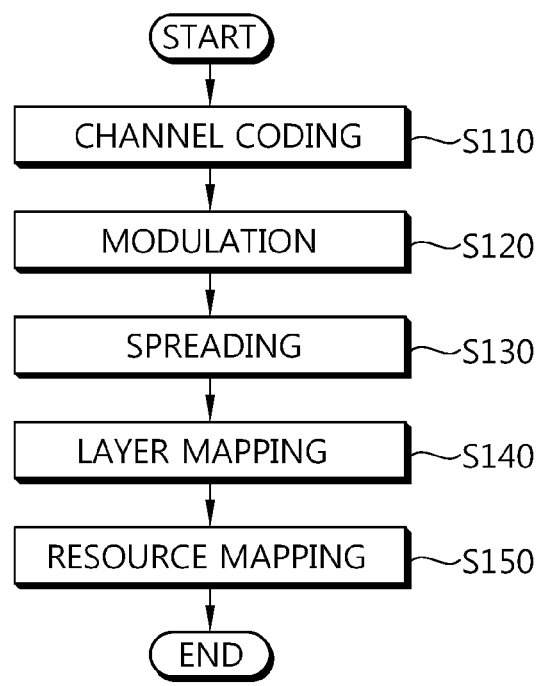
FIG. 11 is a flowchart showing physical hybrid-ARQ indicator channel (PHICH) configuration.

FIG. 11 is a flowchart showing PHICH configuration. The section 6.9 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

Referring to FIG. 11, since an LTE system does not support SU-MIMO in UL transmission, a PHICH carries a 1-bit ACK/NACK signal corresponding to a PUSCH for one UE. In step S110, the 1-bit ACK/NACK signal is subjected to channel coding by using repetition coding at a code rate of 1/3. In step S120, the ACK/NACK signal coded with a 3-bit codeword is mapped to 3 modulation symbols by using binary phase shift keying (BPSK). In step S130, the modulation symbols are spread by using a spreading factor (SF) $N^{PHICH}_{SF}$ and an orthogonal sequence. The number of orthogonal sequences used in the spreading is double of $N^{PHICH}_{SF}$ to apply I/Q multiplexing. $2N^{PHICH}_{SF}$ PHICHs which are spread by using $2N^{PHICH}_{SF}$ orthogonal sequences are defined as one PHICH group. PHICHs belonging to the same PHICH group are identified using different orthogonal sequences. In step S140, layer mapping is performed on the spread symbols according to a rank. In step S150, the layer-mapped symbols are mapped to respective resource elements.

According to the section 6.9 of 3GPP TS 36.211 V8.2.0 (2008-03), a PHICH resource corresponding to a PUSCH is defined by using $I^{lowest\_index}_{PRB\_RA}$ which is a lowest physical resource block (PRB) index of a resource used in the PUSCH and $n_{DMRS}$ which is a cyclic shift of a demodulation reference signal (DM-RS) used in the PUSCH. The DM-RS is a reference signal used for demodulation of data transmitted on the PUSCH. More specifically, the PHICH resource is known by an index pair $(n^{group}_{PHICH}, n^{seq}_{PHICH})$. $n^{group}_{PHICH}$ denotes a PHICH group number, and $n^{seq}_{PHICH}$ denotes an orthogonal sequence index in the PHICH group. $n^{group}_{PHICH}$ and $n^{seq}_{PHICH}$ are given by the following equation.

$$n^{group}_{PHICH} = (I^{lowest\_index}_{PRB\_RA} + n_{DMRS}) \bmod N^{group}_{PHICH}$$

$$n^{seq}_{PHICH} = (\lfloor I^{lowest\_index}_{PRB\_RA} / N^{group}_{PHICH} \rfloor + n_{DMRS}) \bmod 2N^{PHICH}_{SP}$$ [Equation 4]

Herein, 'mod' denotes a modular operation.

$n^{group}_{PHICH}$ has a value between 0 and ($N^{group}_{PHICH}-1$), and the number $N^{group}_{PHICH}$ of PHICH groups is defined by the following equation.

[Equation 5]

$$N^{group}_{PHICH} = \begin{cases} \lceil N_g(N^{DL}_{RB}/8) \rceil & \text{for normal cyclic prefix} \\ 2 \cdot \lceil N_g(N^{DL}_{RB}/8) \rceil & \text{for extended cyclic prefix} \end{cases}$$

Herein, $N_g \in \{1/6, 1/2, 1, 2\}$ is determined by a higher layer.

An orthogonal sequence used in the PHICH is shown in the following table.

TABLE 4

| Sequence index $n^{seq}_{PHICH}$ | Orthogonal sequence | |
|---|---|---|
| | Normal cyclic prefix $N^{PHICH}_{SF} = 4$ | Extended cyclic prefix $N^{PHICH}_{SF} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The DL/UL HARQ can be used with various modifications in the wireless communication system. Hereinafter, for convenience of explanation, an apparatus for transmitting and/or retransmitting data is referred to as a source station, and an apparatus for receiving data and transmitting ACK/NACK for the received data is referred to as a destination station. if a pair of the source station and the destination station is expressed in a format of (source station, destination station) in the wireless communication system, the DL HARQ can be applied to pairs of (BS, Ma UE), (relay, Re UE), (BS, relay), etc. The UL HARQ can be applied to pairs of (Ma UE, BS), (Re UE, relay), (relay, BS), etc.

When performing the DL/UL HARQ, if the source station transmits data the destination station at any transmission start time, a first transmission time interval is hereinafter denoted by a time interval from the transmission start time to a time at which the destination station transmits an ACK/NACK signal for the data to the source station. If the source station receives the NACK signal and thus retransmits the data, a second transmission time interval is denoted by a time interval from the transmission start time to a time at which the data is retransmitted. Of course, the source station may transmit new data instead of retransmitting the data after the second transmission time interval elapses from the transmission start time. For example, this is a case where the source station receives the ACK signal from the destination station.

Figure 12:
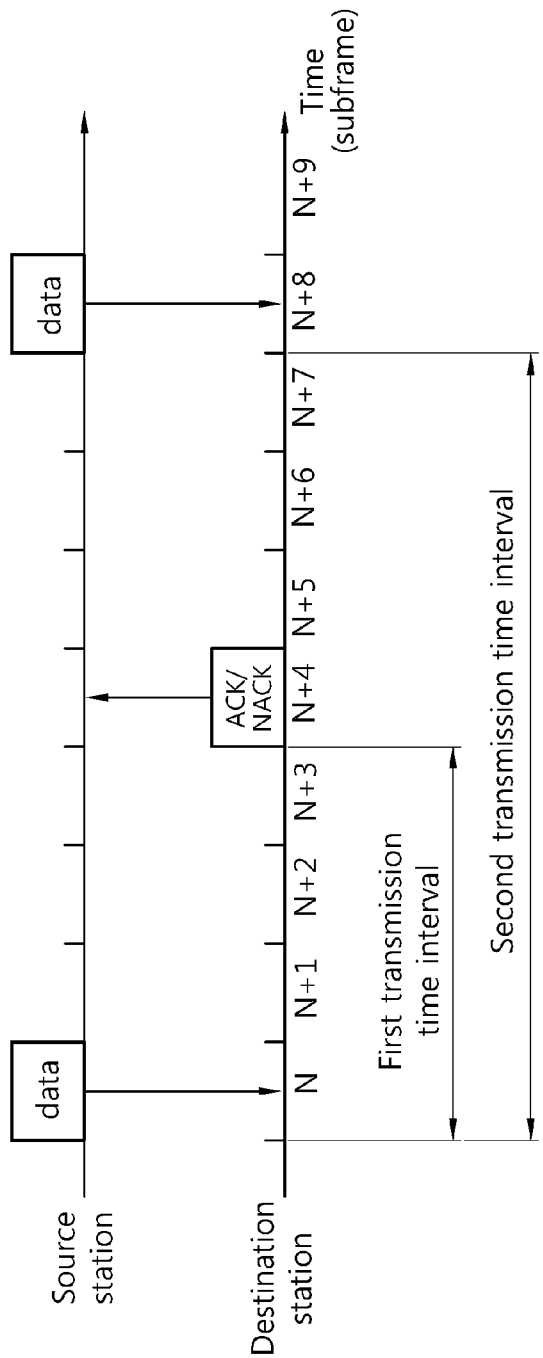
FIG. 12 shows an example of performing an HARQ process in a wireless communication system.

FIG. 12 shows an example of performing an HARQ process in a wireless communication system.

If a source station is a BS and a destination station is a Ma UE in FIG. 12, it is a DL HARQ situation. The BS transmits DL data to the Ma UE in a subframe N which is a transmission start time. The DL data may be transmitted through a PDSCH indicated by a PDCCH of the subframe N. Upon receiving the DL data from the BS, the Ma UE transmits an ACK/NACK signal to the BS after a first transmission time interval elapses. For example, if the first transmission time interval is 4 subframes, the ACK/NACK signal is transmitted through a PUCCH or PUSCH of a subframe N+4. Upon receiving the NACK signal, the BS may retransmit the DL data after a second transmission time interval elapses.

Alternatively, if the source station is the Ma UE and the destination station is the BS in FIG. 12, it is a UL HARQ situation. Upon receiving UL data through a physical uplink shared channel (PUSCH) from the Ma UE in the subframe N which is the transmission start time, the BS transmits an ACK/NACK signal through a PHICH after the first transmission time interval elapses. Upon receiving the NACK signal, the UE can transmit retransmission data for the UL data until the ACK signal is received or until the number of retransmissions reaches the maximum number of retransmissions. The BS may transmit the ACK/NACK signal for the retransmission data through the PHICH.

In the aforementioned DL HARQ or UL HARQ, the first transmission time interval may be 4 subframes (or 4 TTIs). Further, the second transmission time interval may be 8 subframes (or 8 TTIs). The first transmission time interval can be regarded as an ACK/NACK round trip time (RTT), and the second transmission time interval can be regarded as an HARQ period. By considering that the first transmission time interval and the second transmission time interval show a temporal characteristic of the HARQ processing method, the HARQ processing method will be hereinafter referred to as HARQ (second transmission time interval, first transmission time interval) for convenience of explanation. Then, the HARQ processing method described with reference to FIG. 12, i.e., the HARQ processing method in which the second transmission time interval is an interval of 8 subframes and the first transmission time interval is an interval of 4 subframes, can be expressed by HARQ(8, 4).

Figure 13:
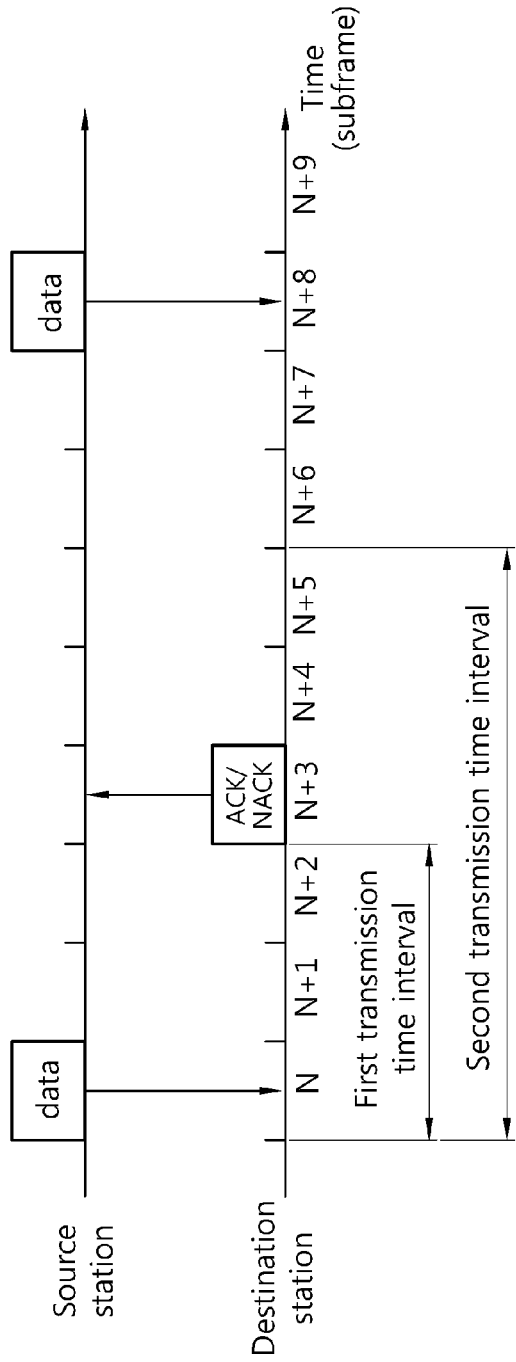
FIG. 13 shows an example of a method of performing an HARQ process in which a second transmission time interval is less than an interval of 8 subframes.

FIG. 13 shows an example of a method of performing an HARQ process in which a second transmission time interval is less than an interval of 8 subframes. Referring to FIG. 13, a source station transmits data in a subframe N which is a transmission start time, and receives an ACK/NACK signal after a first transmission time interval elapses. Herein, the first transmission time interval may be an interval of 3 subframes (i.e., 3 TTIs). Upon receiving the NACK signal, the source station retransmits the data after a second transmission time interval elapses. Herein, the second transmission time interval may be an interval of 6 subframes (i.e., 6 TTIs). That is, HARQ(6, 3) is shown in FIG. 13 as an example of an HARQ period less than an interval of 8 subframes (i.e., 8 TTIs).

Figure 14:
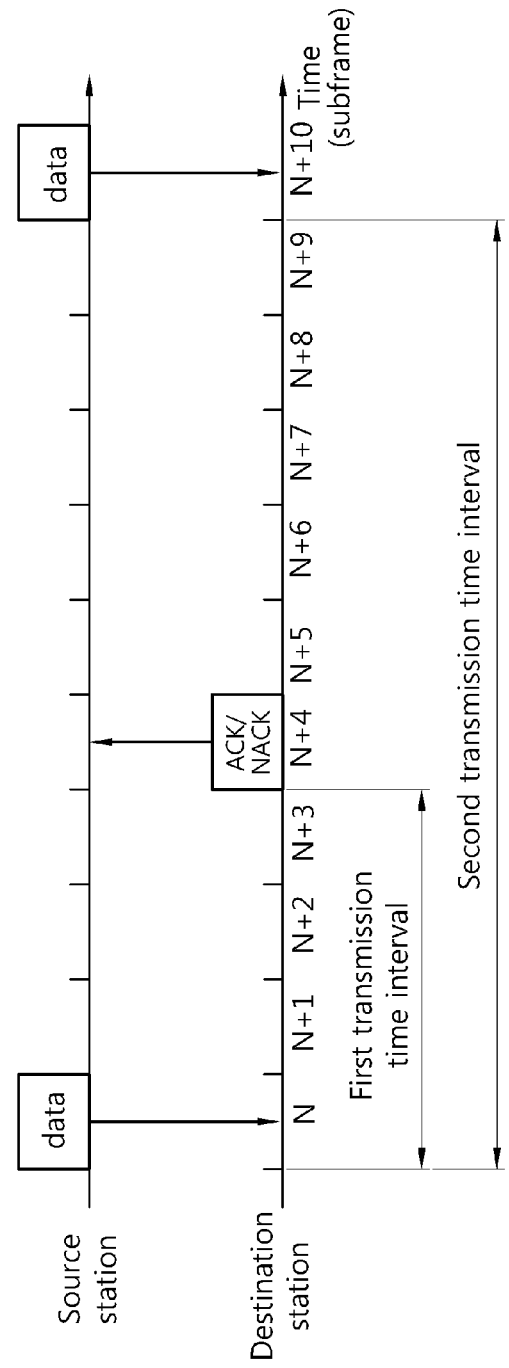
FIG. 14 shows an example of a method of performing an HARQ process in which a second transmission time interval is greater than an interval of 8 subframes.

FIG. 14 shows an example of a method of performing an HARQ process in which a second transmission time interval is greater than an interval of 8 subframes. Referring to FIG. 14, a source station transmits data in a subframe N which is a transmission start time, and receives an ACK/NACK signal after a first transmission time interval elapses. Herein, the first transmission time interval may be an interval of 4 subframes (i.e., 4 TTIs). Upon receiving the NACK signal, the source station retransmits the data after a second transmission time interval elapses. Herein, the second transmission time interval may be an interval of 10 subframes (i.e., 10 TTIs). That is, HARQ(10, 4) is shown in FIG. 14 as an example of an HARQ period greater than an interval of 8 subframes (i.e., 8 TTIs).

Figure 15:
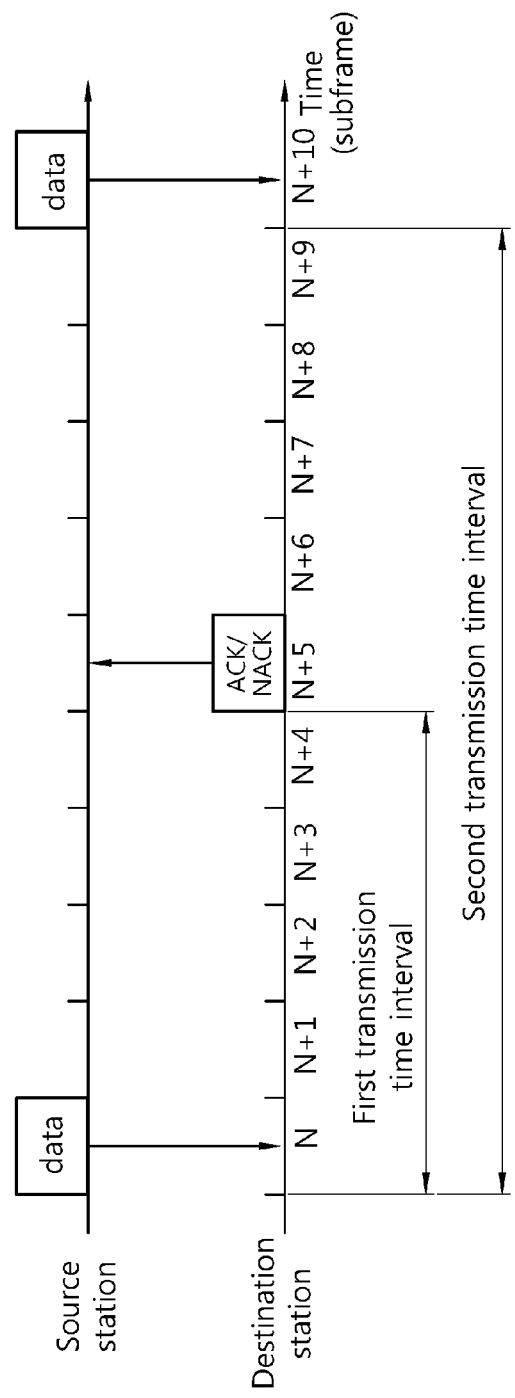
FIG. 15 shows another example of a method of performing an HARQ process in which a second transmission time interval is greater than an interval of 8 subframes.

FIG. 15 shows another example of a method of performing an HARQ process in which a second transmission time interval is greater than an interval of 8 subframes. Referring to FIG. 15, a source station transmits data in a subframe N which is a transmission start time, and receives an ACK/NACK signal after a first transmission time interval elapses. Herein, the first transmission time interval may be an interval of 5 subframes (i.e., 5 TTIs). Upon receiving the NACK signal, the source station retransmits the data after a second transmission time interval elapses. Herein, the second transmission time interval may be an interval of 10 subframes (i.e., 10 TTIs). That is, HARQ(10, 5) is shown in FIG. 15 as an example of an HARQ period greater than an interval of 8 subframes (i.e., 8 TTIs).

The aforementioned HARQ processing methods, i.e., HARQ(8, 4), HARQ(6, 3), HARQ(10, 4), HARQ(10, 5), etc., can be implemented in various combinations in the wireless communication system.

<Cell-Common HARQ Processing Method>

Figure 16:
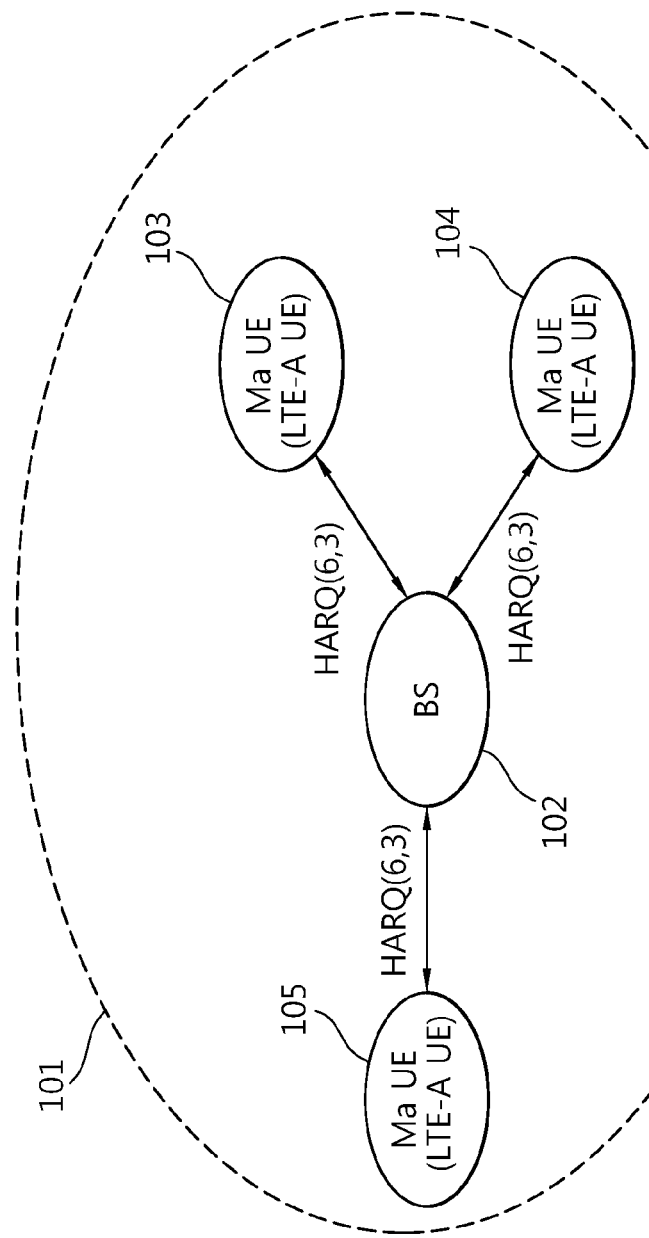
FIG. 16 shows a cell-common HARQ processing method.

FIG. 16 shows a cell-common HARQ processing method.

If there is a plurality of destination stations in a cell 101, a source station can determine a first transmission time interval and a second transmission time interval such that the two intervals are commonly to all destination stations in HARQ applied to the destination stations.

If the source station is a BS 102 and the destination station is Ma UEs 103, 104, and 105, the BS 102 may select any one of HARQ(8, 4), HARQ(6, 3), HARQ(10, 4), and HARQ(10, 5) and apply the selected HARQ to the Ma UEs 103, 104, and 105. For example, the BS may apply HARQ(6, 3) to the Ma UEs or apply HARQ(10, 4) to the Ma UEs. Although not shown in FIG. 16, if an LTE UE exists among the Ma UEs, the BS may apply HARQ(8, 4) to the LTE UE and apply one HARQ processing method (e.g., HARQ(6, 3)) only to an LTE-A UE.

By applying one HARQ processing method to all destination stations in a cell, the source station can minimize a change in the conventional system. For example, it is possible to minimize considerations such as avoidance of collision occurring when a radio resource is allocated for an HARQ ACK/NACK signal.

If the source station is the Ma UEs 103, 104, and 105, and the destination station is the BS 102, there may be a plurality of source stations. When determining an ACK/NACK RTT in the HARQ processing method, it is considered that the destination station is the BS in terms of a decoding processing delay of the destination station and that multipoint-to-single point transmission is performed in UL transmission where the single point is the BS. In such a case, according to whether the BS used as the destination station is an LTE BS or an LTE-A BS and whether backward compatibility will be supported for the LTE system, any one of HARQ(6, 3), HARQ(10, 4), and HARQ(10, 5) can be selected in addition to HARQ(8, 4) and the selected HARQ can be equally applied to the plurality of source stations.

<Destination Station Specific HARQ Processing Method>

Figure 17:
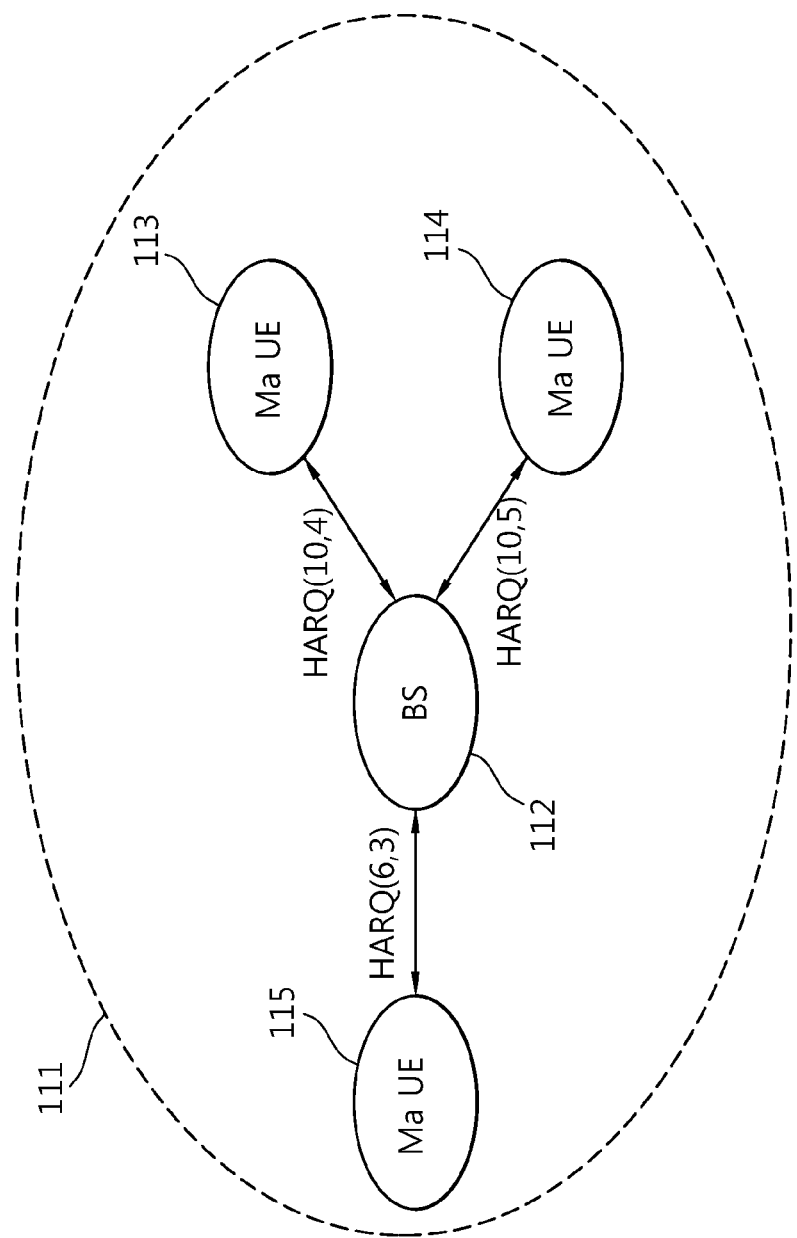
FIG. 17 shows a destination station specific HARQ processing method.

FIG. 17 shows a destination station specific HARQ processing method.

In FIG. 17, a source station may be a BS 112, and a destination station may be a plurality of Ma UEs 113, 114, and 115. The BS 112 can determine a first transmission time interval and a second transmission time interval in a Ma UE specific manner. That is, the BS 112 can apply a different HARQ processing method for each of the Ma UEs in a cell 111. For example, any one of HARQ(8, 4), HARQ(6, 3), HARQ(10, 4), and HARQ(10, 5) can be selected and applied for each Ma UE. A decoding processing delay of each Ma UE may differ according, to decoding capability of each Ma UE. When various UEs having different decoding capabilities are deployed within a wireless communication system, an HARQ processing method suitable for each UE may be applied to exhibit improved performance. Any one of HARQ (8, 4), HARQ(6, 3), HARQ(10, 4), and HARQ(10, 5) can be selected and applied uniquely to any Ma UE group classified according to a type of the Ma UEs. In this case, the Ma UE group may be classified according to decoding capability of the Ma UE.

Even if the source station is the Ma UEs 113, 114, and 115 and the destination station is the BS 112, the BS 112 can apply a different HARQ processing method to each Ma UE. By applying different HARQ processing methods, it is possible to support a situation where various quality of services (QoS) are required based on various application services in UL data transmission.

<HARQ Processing Method in Multiple Carrier System>

When a UE supports carrier/spectrum aggregation, common DL or UL HARQ processing method can be applied to each of multiple carriers except for a case where decoding capability is set differently for each carrier (or component carrier). However, in a case where non-contiguous spectrum aggregation achieved between non-continuous carriers is possible, the HARQ processing method can be determined and applied for each carrier or for each specific carrier group by considering any particular situation of determining whether to apply a traffic property for each carrier or whether to determine a carrier for transmission of the legacy LTE UE.

Figure 18:
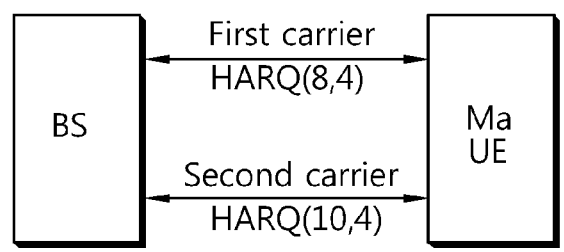
FIG. 18 shows an example of an HARQ processing method in a multiple carrier system.

FIG. 18 shows an example of an HARQ processing method in a multiple carrier system.

In a DL (or UL), between a BS and a Ma UE, HARQ(8, 4) can be applied to a first carrier and HARQ(10, 4) can be applied to a second carrier. That is, the HARQ processing method can be determined and applied for each carrier.

In addition, when the HARQ processing method is determined for each carrier, the HARQ processing method can be determined for each macro UE. That is, a Ma UE 1 can apply HARQ(8, 4) to the first carrier and apply HARQ(10, 4) to the second carrier, and a Ma UE 2 can apply HARQ(8, 4) to the first carrier and apply HARQ(10, 5) to the second carrier.

When spectrum/carrier aggregation is supported in the UL and/or DL, various HARQ processing methods can be applied by being combined through mapping of different UL/DL carriers.

For example, if two DL carriers are mapped to a UL carrier, a cell common HARQ processing method (e.g., HARQ(8, 4)) can be applied to the UL carrier and different cell common HARQ processing methods can be applied to the two DL carriers (e.g., HARQ(10,4) is applied to a DL carrier 1 and HARQ(10,5) is applied to a DL carrier 2).

Alternatively, when two DL carriers are mapped to a UL carrier, the cell common HARQ processing method can be applied to the UL carrier, a destination station specific HARQ processing method can be applied to one of the two DL carriers, and the cell common HARQ processing method can be applied to the other one of the two DL carriers.

When a carrier to which an LTE UE and an LTE-A UE can access and a carrier to which only the LTE-A UE can access are distinctively defined among a plurality of carriers in the multiple carrier system, an HARQ processing method (e.g., HARQ(6, 3), HARQ(10, 4), and HARQ(10, 5)) other than HARQ(8, 4) can be applied to the carrier to which only the LTE-A UE can access. The conventionally used HARQ(8, 4) can be applied to the carrier to which the LTE UE and the LTE-A UE can access, so as to maintain backward compatibility of the wireless communication system.

<Link Specific HARQ Processing Method>

Figure 19:
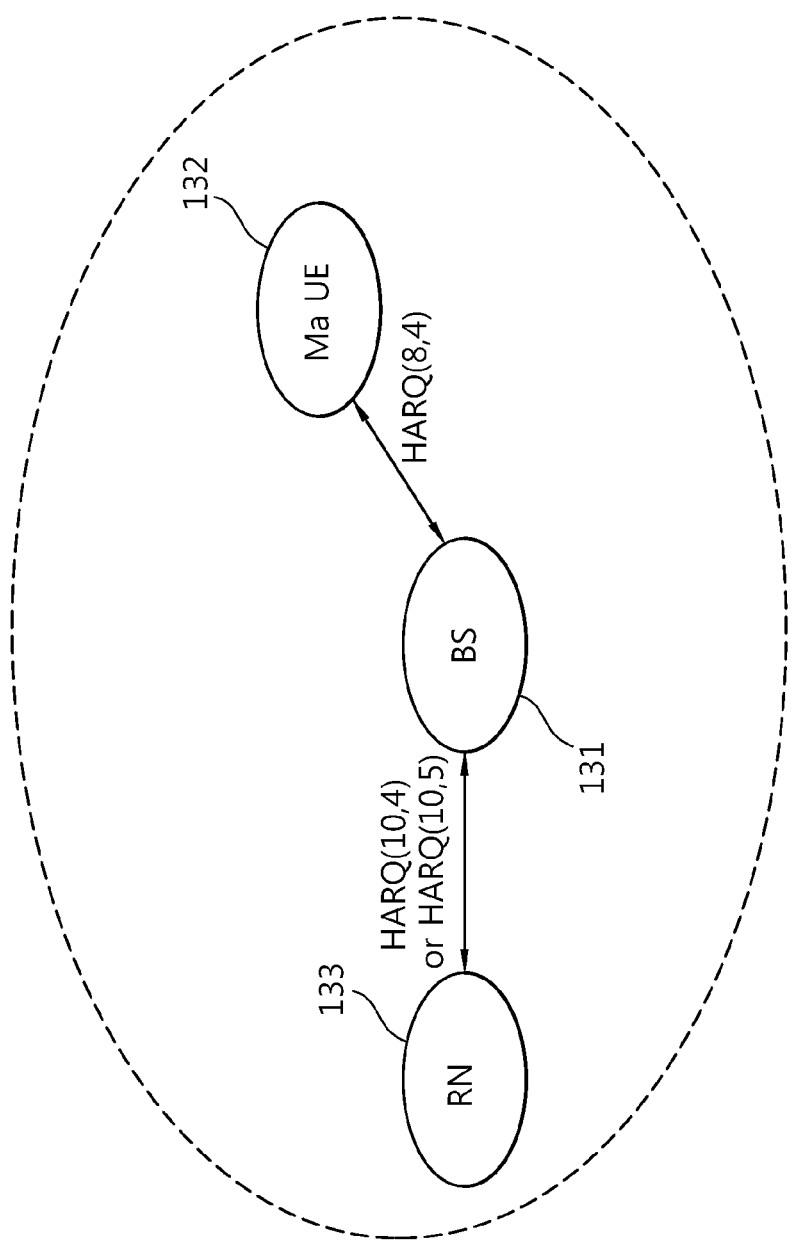
FIG. 19 shows an example of applying an HARQ processing method in a link specific manner.

FIG. 19 shows an example of applying an HARQ processing method in a link specific manner.

In FIG. 19, a source station may be a Ma UE 132 and/or a relay node (RN) 133, and a destination station may be a BS 131. In this case, HARQ(8, 4) can be applied to a UL between the Ma UE 132 and the BS 131, and HARQ(10, 4) or HARQ (10, 5) can be applied to a backhaul UL between the RN 133 and the BS 131.

Alternatively, in FIG. 19, the BS 131 may be a source station, the RN 133 may be a destination station 1, and the Ma UE 132 may be a destination station 2. In this case, HARQ (10, 4) or HARQ(10, 5) can be applied to a backhaul DL between the BS 131 and the RN 133, and HARQ(8, 4) can be applied to a DL between the BS 131 and the Ma UE 132. In other words, the BS 31 can apply a different HARQ processing method according to whether the destination station is the RN 133 or the Ma UE 132.

If HARQ(10, 4) is applied between the BS and the RN in the aforementioned example, the HARQ processing method can be changed to a minimum extent since an ACK/NACK RTT is the same as that used in the HARQ processing method between the BS and the Ma UE (in particular, LTE UE), and there is an advantage in that a method in which the ACK/NACK RTT is an interval of 4 subframes can be utilized in terms of allocation of PHICH radio resources. When HARQ (10, 5) is applied between the BS and the RN, the wireless communication system can be applied in a broader range in terms of a new design.

The HARQ processing method in which an HARQ period corresponds to 10 subframes as in HARQ(10, 4) and HARQ (10, 5) in the backhaul DL is applied based on the consideration that a DL subframe allocated to the RN can be limited in the backhaul DL. This will be described below.

Figure 20:
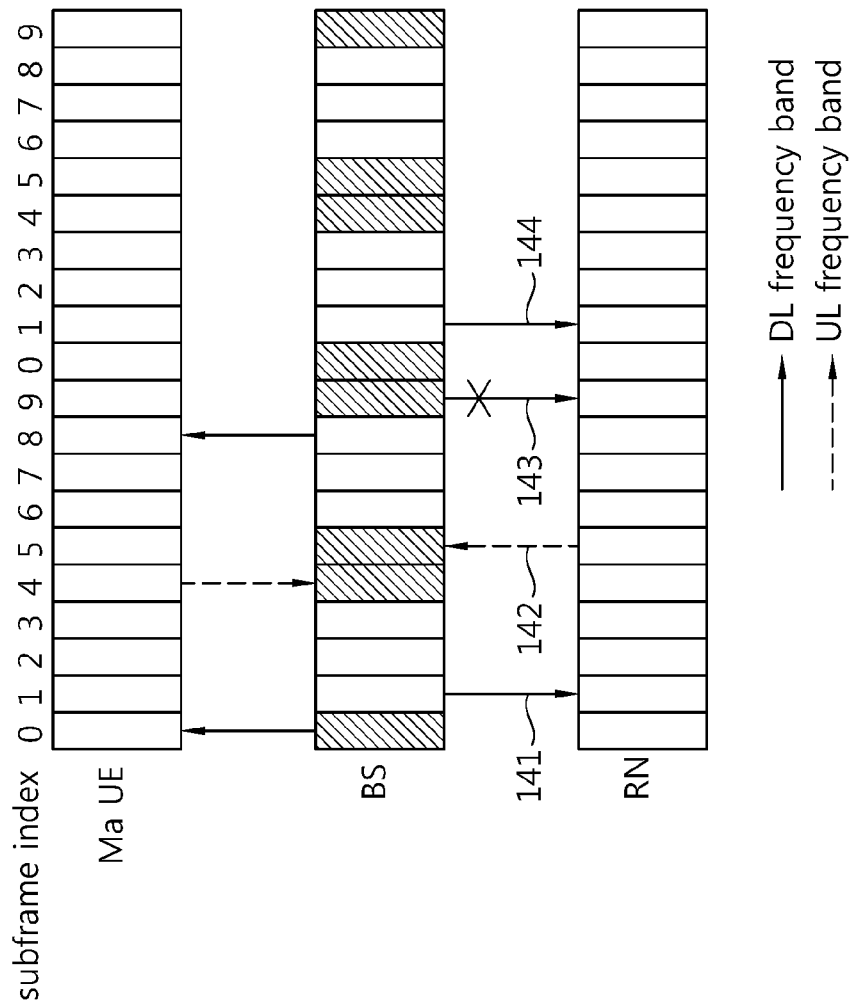
FIG. 20 shows an example of applying an HARQ processing method, in which an HARQ period corresponds to 10 subframes, by a base station to a relay node.

FIG. 20 shows an example of applying an HARQ processing method, in which an HARQ period corresponds to 10 subframes, by a BS to an RN.

A problem may arise when a BS serving as a source station applies an HARQ processing method having the same HARQ period (e.g., an interval of 8 subframes) to a Ma UE and an RN. This is because there is a limitation when the RN allocates a DL subframe. Since subframes 0, 4, 5, and 9 (or subframes 0, 1, 5, and 6 in case of TDD) of a radio frame have be allocated to the Ma UE in FDD, these subframes cannot be allocated to the RN. When such a frame is a called a limited subframe, there may be a case where the RN receives DL data from the BS in the limited subframe. For example, the BS transmits DL data to the RN in the subframe 1 (as indicated by 141 in the figure), and the RN transmits NACK to the BS in the subframe 5 (as indicated by 142 in the figure). Then, the BS has to retransmit the DL data to the RN in the subframe 9 (as indicated by 143 in the figure). The subframe 9 is a limited subframe which is limited in the allocation to the RN. Therefore, a problem may occur in the HARQ processing. To solve such a problem, HARQ(10, 4) (or HARQ(10, 5)) can be applied between the BS and the RN. Then, the BS retransmits the DL data in the subframe 1 of a next radio frame (as indicated by 144 in the figure). An HARQ period is equal to the number of subframes included in the radio frame, and thus an index of a subframe in which data is retransmitted is fixed. Therefore, the problem can be solved by allocating a subframe other than the limited subframe to a backhaul DL.

Figure 21:
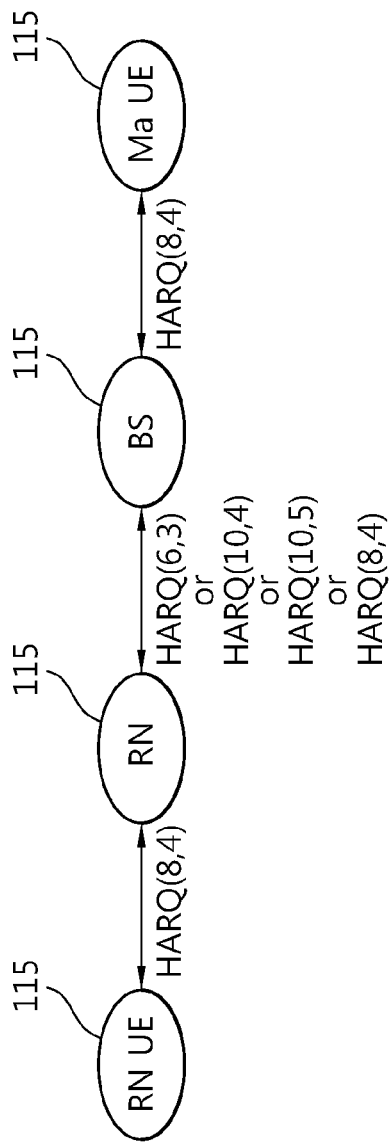
FIG. 21 shows another example of an HARQ processing method in a link specific manner.

FIG. 21 shows another example of an HARQ processing method in a link specific manner.

HARQ(8, 4) can be applied to a UL/DL between a BS 151 and a Ma UE 152 and to an access UL/access DL between an RN 153 and an RN UE 154, and any one of HARQ(8, 4), HARQ(6, 3), HARQ(10, 4), and HARQ(10, 5) can be applied to a backhaul UL/backhaul DL between the BS 151 and the RN 153. Such a method can provide optimized performance in a link (e.g., backhaul link and access link) introduced in a new wireless communication system such as LTE-A.

If an HARQ processing method applied to the DL, the backhaul DL, and the access DL is called a DL HARQ processing method in the aforementioned link specific HARQ processing method, and an HARQ processing method applied to the UL, the backhaul UL, and the access UL is called a UL HARQ processing method, then the DL HARQ processing method and the UL HARQ processing method can be performed in various combinations as shown in the following table.

TABLE 5

| DL HARQ processing method | UL HARQ processing method |
|---|---|
| destination station specific HARQ processing method | cell common HARQ processing method |
| destination station specific HARQ processing method | destination station specific HARQ processing method |
| destination station specific HARQ processing method and link specific HARQ processing method | destination station specific HARQ processing method and link specific HARQ processing method |
| destination station specific HARQ processing method and link specific HARQ processing method | HARQ(8, 4) |

In addition, a different HARQ processing method can be applied according to a time period on a transmission link on the basis of restrictions on transmission or reception of the destination station or the source station. For example, if the source station is the BS and the destination station is the RN, there is a limitation in allocation of a DL subframe as described above with reference to FIG. 20. On the basis of the restrictions on the backhaul link, entire HARQ processing method can be defined by selectively applying HARQ(8, 4) and HARQ(10, 4) to a time period including a specific number of subframes. The HARQ processing method can be embodied as a pattern for subframe configuration on the backhaul DL and the backhaul UL. In another example, multiplexing can be performed such that HARQ(10, 4), HARQ(10, 5), and HARQ(10, 6) are applied for each time period between the BS and the RN by considering the aforementioned restrictions.

Hereinafter, how to perform signaling on the aforementioned various HARQ processing methods will be described.

Since the BS can select which method will be applied among various HARQ processing methods, the BS provides selection information on the selected HARQ processing method to the Ma UE and/or the RN. Herein, the selection information implies information indicating which method is selected among the various HARQ processing methods, and the selection information may be a value which is semi-statically set.

When the cell common HARQ processing method is applied to a DL and/or UL (including a case where the link specific HARQ processing method and/or the HARQ processing method in the multiple carrier system are combined with the cell common HARQ processing method), the selection information can be reported to the Ma UE and/or the RN by using system information transmitted through a physical broadcast channel (PBCH) or a PDSCH. That is, a system information block (SIB) of any class can be reported to the Ma UE and/or the RN by using a higher layer signal such as radio resource control (RRC).

Even if the destination station specific HARQ processing method is applied to the UL, the selection information can be reported to the Ma UE and/or the RN by using the system information transmitted through the PBCH or the PDSCH.

Alternatively, the BS may determine an HARQ processing method that can be supported by the Ma UE by using a message transmitted to the BS in an initial random access process, and thereafter may report the HARQ processing method to the Ma UE by using additional UE specific RRC signaling. In the initial random access process, the Ma UE selects any one random access preamble from a random access preamble set, and transmits the selected random access preamble to the BS by using physical random access channel (PRACH) resources. Information on configuration of the random access preamble set can be obtained from the BS by using a part of system information or a handover command message. The Ma UE attempts to receive its random access response within a random access response reception window. The random access response reception window is a window for monitoring the random access response. The random access response includes a time alignment (TA) value for UL alignment of the Ma UE, UL radio resource allocation information, a random access preamble identifier (RAPID) for identifying Ma UEs performing random access, and a temporary identifier of the Ma UE such as a temporary cell-radio network temporary identity (C-RNTI). The RAPID is for identifying the received random access preamble. The Ma UE applies the TA value, and transmits a scheduled message including the random access identifier to the BS by using the UL radio resource allocation information. The random access identifier is used when the BS identifies a Ma UE performing the random access process. The BS can recognize whether the Ma UE is an LTE UE or an LTE-A UE for example by using a message such as the random access identifier transmitted by the Ma UE. Therefore, the BS can recognize the HARQ processing method that can be supported by the Ma UE, and can report the selection information to the Ma UE by using UE-specific RRC signaling. Such a process can be applied to not only the macro UE but also the RN.

The selection information does not have to be explicitly reported to all destination stations. The selection information may be implicitly reported by being combined to a configuration of an RRC parameter or a pattern of a subframe in which data is transmitted in a radio frame. For example, if SIB-2 type RRC parameters regarding a configuration of an MBSFN subframe to be transmitted to the RN have a period of 10 ms or 40 ms and are formed by using a specific pattern (e.g., when allocation of the MBSFN subframe in the radio frame is reported in a bitmap format), an HARQ processing method for the RN and the RN UE can be determined to a predetermined HARQ processing method. The RN UE can implicitly know the HARQ processing method of an access link between the RN and the RN UE from the specific pattern of the RRC parameters regarding the configuration of the MBSFN subframe to be transmitted to the RN. In this case, the RN and the RN UE may have a mapping relationship between the HARQ processing method and a bitmap for reporting the configuration of the MBSFN subframe in a backhaul link.

In the multiple carrier system, the aforementioned selection information can be transmitted by being allocated to a specific carrier or by being allocated to each carrier. For example, the BS can transmit the selection information through a PDSCH of a specific DL carrier (e.g., a DL carrier 1) selected from two DL carriers. The DL carrier 1 may be a primary carrier (or an anchor carrier) which is set in a cell specific manner or a destination station specific manner. In this method, if there is selection information which is common to the HARQ processing method, for example, in such a case where an ACK/NACK RTT is identical for each carrier and only an HARQ period differs, the common selection information can be transmitted through a selected specific carrier.

In another example, if the HARQ processing method differs from one carrier to another, the selection information can be transmitted for each carrier. For example, if the HARQ period differs from one carrier to another, different selection information can be transmitted through a PDSCH of each carrier. Alternatively, it is also possible to combine the two methods above.

When a different HARQ processing method is applied in the wireless communication system, collision may occur in radio resource allocation.

Figure 22:
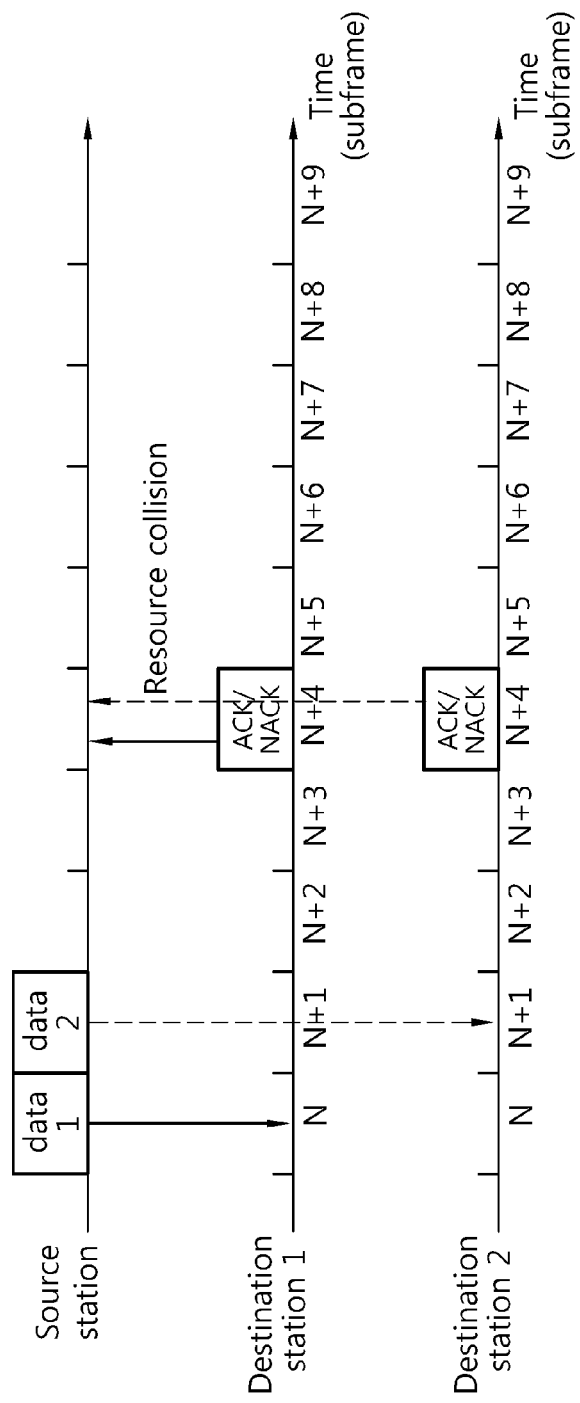
FIG. 22 shows an exemplary case where collision occurs in radio resource allocation when a different destination station specific HARQ processing method is performed in a downlink.

FIG. 22 shows an exemplary case where collision occurs in radio resource allocation when a different destination station specific HARQ processing method is performed in a DL. It is assumed that a source station is a BS, a destination station 1 is a Ma UE 1, and a destination station 2 is a Ma UE 2.

The BS applies different destination station specific HARQ processing methods in such a manner HARQ(8, 4) is applied to the Ma UE 1 and HARQ(6, 3) is applied to the Ma UE 2. In this case, the Ma UE 1 transmits an ACK/NACK signal on data 1 transmitted through a PDSCH of a subframe N to the BS by using a PUCCH of a subframe N+4. The Ma UE 2 transmits an ACK/NACK signal for data 2 transmitted through a PDSCH of a subframe N+1 to the BS by using a PUCCH of a subframe N+4. In this case, if lowest CCE indices of a PDCCH for PDSCH reception of the subframe N with respect to the Ma UE 1 and a PDCCH for PDSCH reception of the subframe N+1 with respect to the Ma UE 2 are used in common, a PUCCH radio resource of the subframe N+4 in which the ACK/NACK signal is transmitted can be equally allocated. As a result, collision may occur in allocation of the PUCCH radio resource.

Likewise, if different HARQ processing methods are performed also in a UL, collision may occur in radio resource allocation. For example, it is assumed that the source station is the Ma UE 1 and the Ma UE 2, the destination station is the BS, HARQ(8, 4) is applied between the Ma UE 1 and the BS, and HARQ(10, 5) is applied between the Ma UE 2 and the BS.

The Ma UE 1 can transmit the data 1 to the BS in the PUSCH of the subframe N, and the Ma UE 2 can transmit the data 2 to the BS in the PUSCH of a subframe N−1. Then, the BS transmits an ACK/NACK signal to the Ma UE 1 and the Ma UE 2 through a PHICH of a subframe N+4. In this case, if a lowest physical resource block (PRB) index $I^{lowest\_index}_{PRB\_RA}$ used in the PUSCH of the subframe N or the subframe N−1 and a cyclic shift $n_{DMRS}$ of a data demodulation reference signal used in the PUSCH are equal, the same PHICH resource can be allocated to the two subframes. That is, the PHICH resource for transmitting the ACK/NACK signal is allocated equally in the subframe N+4, and thus collision may occur in radio resource allocation.

First, in order to solve the problem of collision occurring in PUCCH resource allocation, a different PUCCH resource can be allocated according to a different HARQ processing method performed in the DL.

Figure 23:
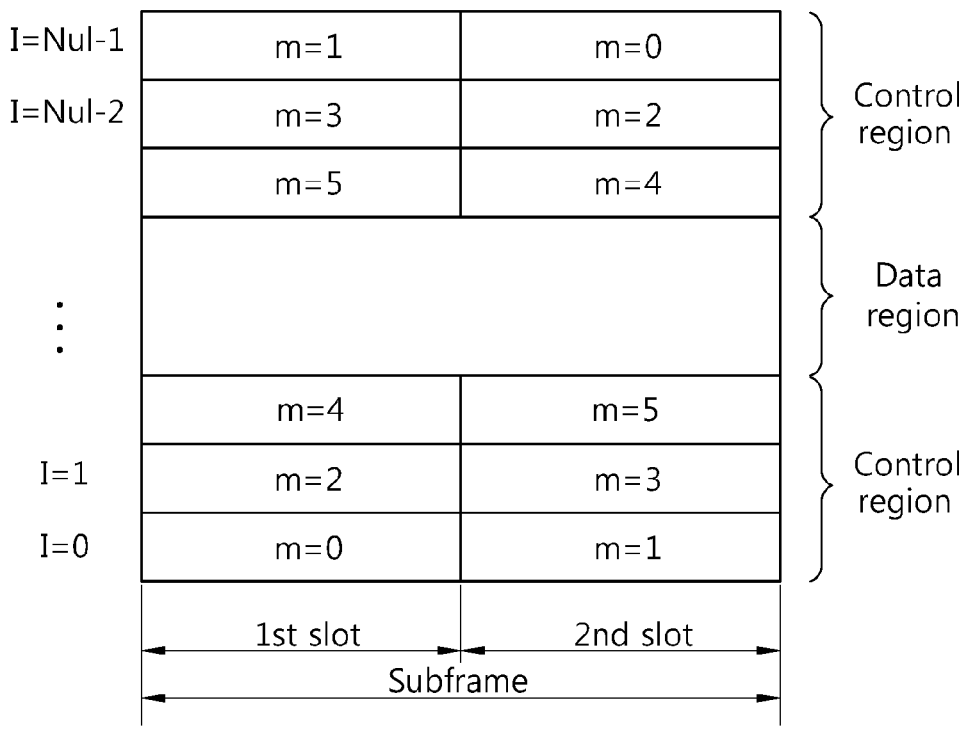
FIG. 23 shows an example of allocating a different physical uplink control channel (PUCCH) resource according to a different HARQ processing method.

FIG. 23 shows an example of allocating a different PUCCH resource according to a different HARQ processing method.

Referring to FIG. 23, CQI, an ACK/NACK signal for HARQ(8, 4), an ACK/NACK signal for an HARQ processing method in which an HARQ period is not equal to an interval of 8 subframes (e.g., HARQ(6, 3), HARQ(10, 4), HARQ(10, 5), etc.) can be allocated sequentially to RB pairs having an index m=1, 3, 5 (or m=0, 2, 4). In this case, the number of allocated RBs can be determined by regulating a cyclic shift (CS) amount and a base sequence applied for each PUCCH from a band edge of a UL subframe frequency band.

Alternatively, CQI, an ACK/NACK signal for an HARQ processing method in which an HARQ period is not equal to an interval of 8 subframe (e.g., HARQ(6, 3), HARQ(10, 4), HARQ(10, 5), etc.), and an ACK/NACK signal for HARQ(8, 4) can be allocated sequentially to RB pairs having an index m=1, 3, 5 (or m=0, 2, 4). The latter method is for effective PUCCH resource allocation in consideration of signaling overhead, backward compatibility, etc.

In the aforementioned example, there may be a PUCCH resource (i.e., mixed RB) to which an ACK/NACK signal for HARQ(8, 4) and an ACK/NACK signal for an HARQ processing method in which an HARQ period is not equal to an interval of 8 subframes are simultaneously allocated. When there is a need to avoid generation of the mixed RB, RBs identified by different slots can be allocated to the ACK/NACK signal for HARQ(8, 4) and the ACK/NACK signal for the HARQ processing method in which an HARQ period is not equal to an interval of 8 subframes. For example, RBs can be allocated in different slots in such a manner that m=3 is allocated to the ACK/NACK signal for HARQ(8, 4) and m=2 is allocated to the ACK/NACK signal for the HARQ processing method in which the HARQ period is not equal to an interval of 8 subframes.

The aforementioned method of allocating the PUCCH resource can be applied to PUCCH resource allocation for DL transmission not only in a link between the BS and the Ma UE but also in a backhaul link and an access link.

In order to solve the problem of collision occurring in PHICH resource allocation, a different PHICH resource can be allocated according to a different HARQ processing method in a UL. As described above with reference to Equation 4, the PHICH resource is reported by an index pair $(n^{group}_{PHICH}, n^{seq}_{PHICH})$. Further, the number $N^{group}_{PHICH}$ of PHICH groups is given by Equation 5. In this case, the value $N^{group}_{PHICH}$ can be doubled by multiplying $N_9$ of Equation 5 by a scaling factor (e.g., 2). Thereafter, the ACK/NACK signal for HARQ(8, 4) and the ACK/NACK signal for the HARQ processing method in which the HARQ period is not equal to an interval of 8 subframes (e.g., HARQ(6, 3), HARQ(10, 4), HARQ(10, 5), etc.) can be designated to different PHICH groups. Alternatively, a logical PHICH resource can be allocated in the order (or reverse order) of the ACK/NACK signal for HARQ(8, 4) and the ACK/NACK signal for the HARQ processing method in which the HARQ period is not equal to an interval of 8 subframes.

Alternatively, without having to identify the PHICH group for each UL subframe in which the PUSCH is transmitted, a VRB of UL subframes in which the PUSCH is transmitted can be configured to have a contiguous logical index, and then a radio resource for the PHICH can be allocated based on such a new logical index and a value $n_{DMRS}$.

Figure 24:
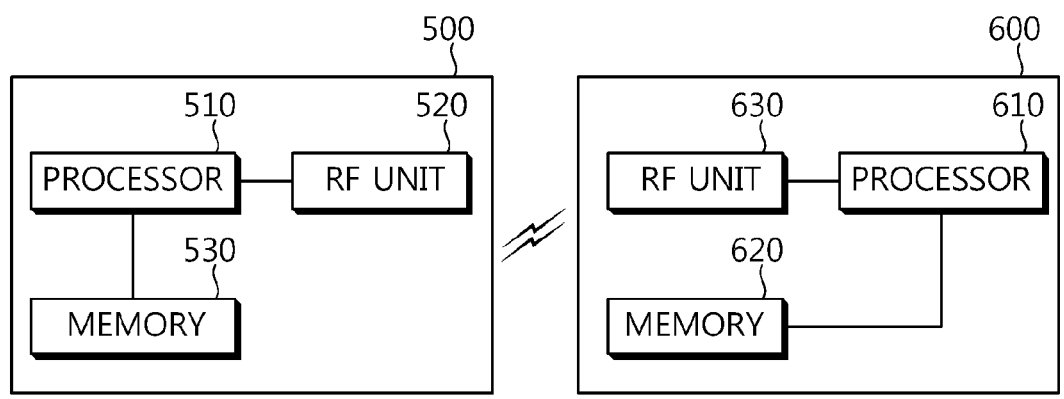
FIG. 24 is a block diagram showing a wireless communication system for implementing an embodiment of the present invention.

FIG. 24 is a block diagram showing a wireless communication system for implementing an embodiment of the present invention. A BS 500 includes a processor 510, a memory 530, and a radio frequency (RF) unit 520. The processor 510 supports HARQ, configures a PHICH, and transmits ACK/NACK through the configured PHICH. Procedures, methods, and functions performed by the BS in the aforementioned embodiments can be implemented by the processor 510. The memory 530 is coupled to the processor 510, and stores a variety of information for driving the processor 510. The RF unit 520 is coupled to the processor 510, and transmits and/or receives a radio signal. The BS may be a source station or a destination station.

A UE 600 includes a processor 610, a memory 620, and an RF unit 630. The processor 610 supports HARQ, transmits UL data, and determines a PHICH index for identifying a PHICH. Procedures, methods, and functions performed by the BS in the aforementioned embodiments can be implemented by the processor 610. The memory 630 is coupled to the processor 610, and stores a variety of information for driving the processor 610. The UE may be a source station or a destination station. Although the UE has been exemplified in the above description, the same structure is also applied to an RN.

The processors 510 and 610 may include an application-specific integrated circuit (ASIC), a separate chipset, a logic circuit, and/or a data processing unit. The memories 520 and 620 may include a read-only memory (ROM), a random access memory (RAM), a flash memory, a memory card, a storage medium, and/or other equivalent storage devices. The RF units 530 and 630 may include a base-band circuit for processing a radio signal. When the embodiment of the present invention is implemented in software, the aforementioned methods can be implemented with a module (i.e., process, function, etc.) for performing the aforementioned functions. The module may be stored in the memories 520 and 620 and may be performed by the processors 510 and 610. The memories 520 and 620 may be located inside or outside the processors 510 and 610, and may be coupled to the processors 510 and 610 by using various well-known means.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing a hybrid automatic repeat request (HARQ) process by a source station in a wireless communication system, the method comprising:

receiving a message from a destination station, the message comprising HARQ information and the HARQ information indicating supportable HARQ timings of the destination station;

transmitting data to the destination station at a first downlink subframe of a first downlink carrier and a first downlink subframe of a second downlink carrier;

receiving acknowledgment (ACK) or negative-acknowledgement (NACK) signals for the data from the destination station at one uplink subframe of an uplink carrier; and retransmitting the data at a second downlink subframe of the first downlink carrier and a third downlink subframe of the second downlink carrier, when the NACK signal is received, wherein a time interval from the first downlink subframe of the first downlink carrier to the second downlink subframe of the first downlink carrier is fixed to 8 subframes, wherein a time interval from the first downlink subframe of the second downlink carrier to the third downlink subframe of the second downlink carrier is selected among the supportable HARQ timings indicated by the message, and wherein a time interval from the first downlink subframe of the first downlink carrier to the one uplink subframe is fixed to 4 subframes.

2. The method of claim 1, wherein the time interval from the first downlink subframe of the second downlink carrier to the third downlink subframe of the second downlink carrier is any one of an interval of 6 subframes and an interval of 10 subframes.

3. The method of claim 1, further comprising:
transmitting selection information,
wherein the selection information indicates a HARQ timing selected among the supportable HARQ timings.

4. The method of claim 1, wherein:
the source station is a base station; and
the destination station is a relay station or a macro user equipment.

5. An apparatus, the apparatus comprising:
a radio frequency (RF) unit configured to transmit and receive a radio signal; and
a processor coupled to the RF unit, the processor being configured to:
receive a message from a destination station, the message comprising HARQ information and the HARQ information indicating supportable HARQ timings of the destination station;
transmit data to the destination station at a first downlink subframe of a first downlink carrier and a first downlink subframe of a second downlink carrier;
receive acknowledgment (ACK) or negative-acknowledgement (NACK) signals for the data from the destination station at one uplink subframe of an uplink carrier; and
retransmit the data at a second downlink subframe of the first downlink carrier and a third downlink subframe of the second downlink carrier, when the NACK signal is received,
wherein a time interval from the first downlink subframe of the first downlink carrier to the second downlink subframe of the first downlink carrier is fixed to 8 subframes, and
wherein a time interval from the first downlink subframe of the second downlink carrier to the third downlink subframe of the second downlink carrier is selected among the supportable HARQ timings indicated by the message.

6. The method of claim 1, further comprising:
receiving a random access preamble from the destination station;
transmitting a random access response as a response for the random access preamble, the random access response comprising a temporary identifier and information for uplink resource allocation,
wherein the message comprises the temporary identifier, and wherein the message is received through an uplink resource indicated by the information for uplink resource allocation.

7. The method of claim 1, wherein the one uplink subframe of the uplink carrier comprises a first slot and a second slot in a time domain.

8. The method of claim 7, wherein, when first data is transmitted at the first downlink subframe of the first downlink carrier and second data is transmitted at the first downlink subframe of the second downlink carrier to the destination station:
- a first ACK/NACK signal for the first data is received at the first slot; and
- a second ACK/NACK signal for the second data is received at the second slot.

* * * * *